(12) United States Patent
Sano

(10) Patent No.: US 10,992,063 B2
(45) Date of Patent: Apr. 27, 2021

(54) ANTENNA APPARATUS, METHOD, AND ELECTRONIC APPARATUS

(71) Applicant: KABUSHIKI KAISHA TOSHIBA, Minato-ku (JP)

(72) Inventor: Makoto Sano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/809,660

(22) Filed: Mar. 5, 2020

(65) Prior Publication Data

US 2020/0335880 A1 Oct. 22, 2020

(30) Foreign Application Priority Data

Apr. 18, 2019 (JP) .............................. JP2019-079677

(51) Int. Cl.
  *H01Q 21/24* (2006.01)
  *H01Q 1/42* (2006.01)
  *H01P 1/17* (2006.01)
  *H01Q 1/12* (2006.01)

(52) U.S. Cl.
  CPC .......... *H01Q 21/245* (2013.01); *H01P 1/173* (2013.01); *H01Q 1/1264* (2013.01); *H01Q 1/421* (2013.01)

(58) Field of Classification Search
  CPC ...... H01Q 1/421; H01Q 1/1265; H01Q 21/24; H01Q 21/245; H01P 1/173
  See application file for complete search history.

(56) References Cited

U.S. PATENT DOCUMENTS

| | | | |
|---|---|---|---|
| 9,571,183 B2 | 2/2017 | Runyon et al. | |
| 10,218,426 B1 | 2/2019 | Sano et al. | |
| 2015/0226846 A1* | 8/2015 | Tedeschi | H01Q 9/285 342/368 |
| 2016/0372820 A1* | 12/2016 | Collignon | H01Q 1/38 |
| 2019/0140362 A1* | 5/2019 | Edenfield | H01Q 23/00 |

FOREIGN PATENT DOCUMENTS

| | | |
|---|---|---|
| JP | 63-238726 A | 10/1988 |
| JP | 8-78947 A | 3/1996 |
| JP | 2019-50521 A | 3/2019 |

* cited by examiner

*Primary Examiner* — Raymond S Dean
(74) *Attorney, Agent, or Firm* — Oblon, McClelland, Maier & Neustadt, L.L.P.

(57) ABSTRACT

According to one embodiment, an antenna apparatus includes a first phase shifter to shift a phase of a left-hand circularly polarized signal representing a left-hand circularly polarized wave; a second phase shifter to shift a phase of a right-hand circularly polarized signal representing a right-hand circularly polarized wave; a control circuit determining a first phase shift amount of the first phase shifter and a second phase shift amount of the second phase shifter based on a difference between a phase shift amount of the first phase shifter and a phase shift amount of the second phase shifter; and a radiating element radiating the left-hand circularly polarized wave and the right-hand circularly polarized wave based on the left-hand circularly polarized signal of which the phase is shifted by the first phase shift amount and the right-hand circularly polarized signal of which the phase is shifted by the second phase shift amount.

20 Claims, 31 Drawing Sheets

ANTENNA APPARATUS, METHOD, AND ELECTRONIC APPARATUS

CROSS REFERENCE TO RELATED APPLICATIONS

This application is based upon and claims the benefit of priority from the prior Japanese Patent Application No. 2019-079677, filed on Apr. 18, 2019, the entire contents of which are incorporated herein by reference.

FIELD

Embodiments described herein relate to an antenna apparatus, a method, and an electronic apparatus.

BACKGROUND

An antenna apparatus includes an antenna element that transmits and receives a right-hand circularly polarized wave and a left-hand circularly polarized wave, and phase shifters change a phase of a signal of the right-hand circularly polarized wave and a phase of a signal of the left-hand circularly polarized wave. To perform satisfactory communication, it is necessary to align a polarization plane on a transmission side and a polarization plane on a receiver side. Therefore, the antenna apparatus changes an angle of each of the polarization planes in some cases. It is desirable to provide an antenna apparatus that can control phase shift amounts of the respective phase shifters to change the angles of the polarization planes.

SUMMARY

According to one embodiment, an antenna apparatus includes a first phase shifter, a second phase shifter, control circuit and a radiating element. The first phase shifter shifts a phase of a left-hand circularly polarized signal representing a left-hand circularly polarized wave. The second phase shifter shifts a phase of a right-hand circularly polarized signal representing a right-hand circularly polarized wave. The control circuit determines a first phase shift amount of the first phase shifter and a second phase shift amount of the second phase shifter based on a difference between a phase shift amount of the first phase shifter and a phase shift amount of the second phase shifter. The radiating element radiates the left-hand circularly polarized wave and the right-hand circularly polarized wave based on the left-hand circularly polarized signal of which the phase is shifted by the first phase shift amount and the right-hand circularly polarized signal of which the phase is shifted by the second phase shift amount.

DETAILED DESCRIPTION

Some embodiments of the present invention are described below.

First Embodiment

Figure 1:
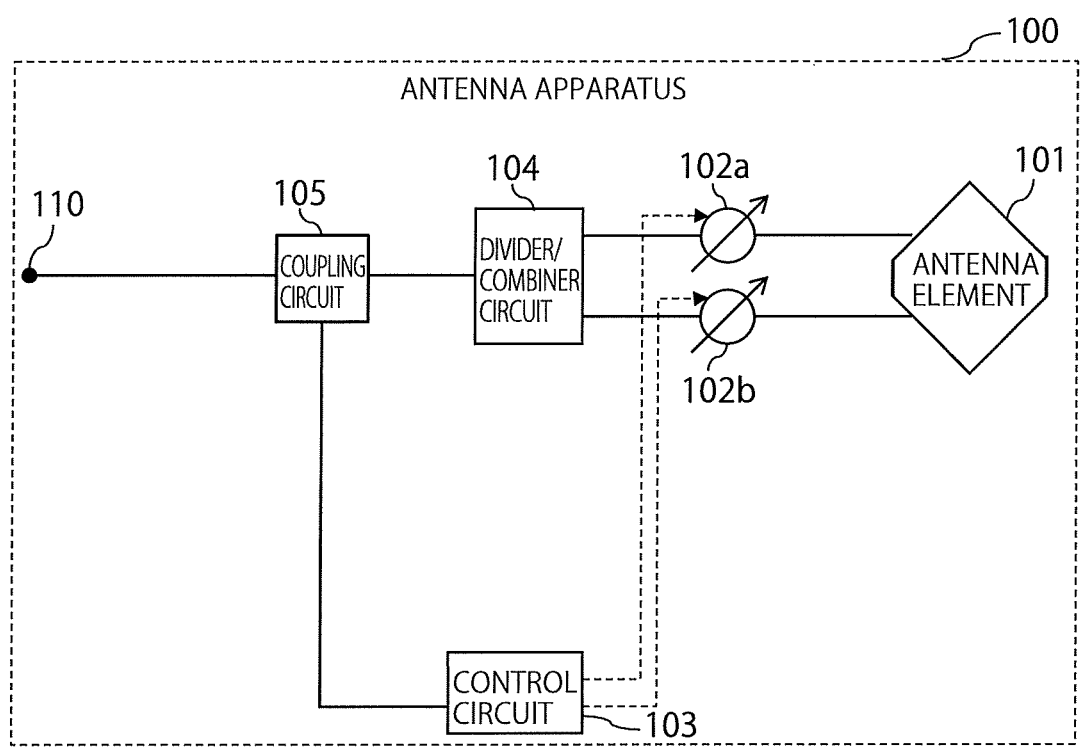
FIG. 1 is a configuration diagram of an antenna apparatus 100 according to a first embodiment.

FIG. 1 is a diagram illustrating a configuration of an antenna apparatus 100 according to a first embodiment. The antenna apparatus 100 is an antenna apparatus that performs communication by transmitting and receiving a left-hand circularly polarized wave and a right-hand circularly polarized wave. The antenna apparatus 100 can change (hereinafter, also referred to as shift) a phase of a high-frequency signal representing the left-hand circularly polarized wave (hereinafter, also referred to as left-hand circularly polarized signal) and a phase of a high-frequency signal representing the right-hand circularly polarized wave (hereinafter, also referred to as right-hand circularly polarized signal). The phase of the left-hand circularly polarized signal and the phase of the right-hand circularly polarized signal are shifted by respective phase shifters provided in the antenna apparatus 100. When the signals pass through the phase shifters, power loss occurs. The power loss is referred to as insertion loss. The phase of the left-hand circularly polarized signal and the phase of the right-hand circularly polarized signal are shifted based on the insertion losses, which makes it possible to control phase shift amounts of the respective phase shifters to change angles of polarization planes. Further, the phase of the left-hand circularly polarized signal and the phase of the right-hand circularly polarized signal are shifted such that the insertion losses are similar to each other, which can change the angles of the polarization planes (hereinafter, also referred to as polarization angles) while maintaining excellent cross polarization discrimination (XPD).

It is known that sum of the left-hand circularly polarized wave and the right-hand circularly polarized wave generates a linearly polarized wave. Description that the polarization angle of the linearly polarized wave is changeable with reference to FIG. 2 is given below.

Figure 2:
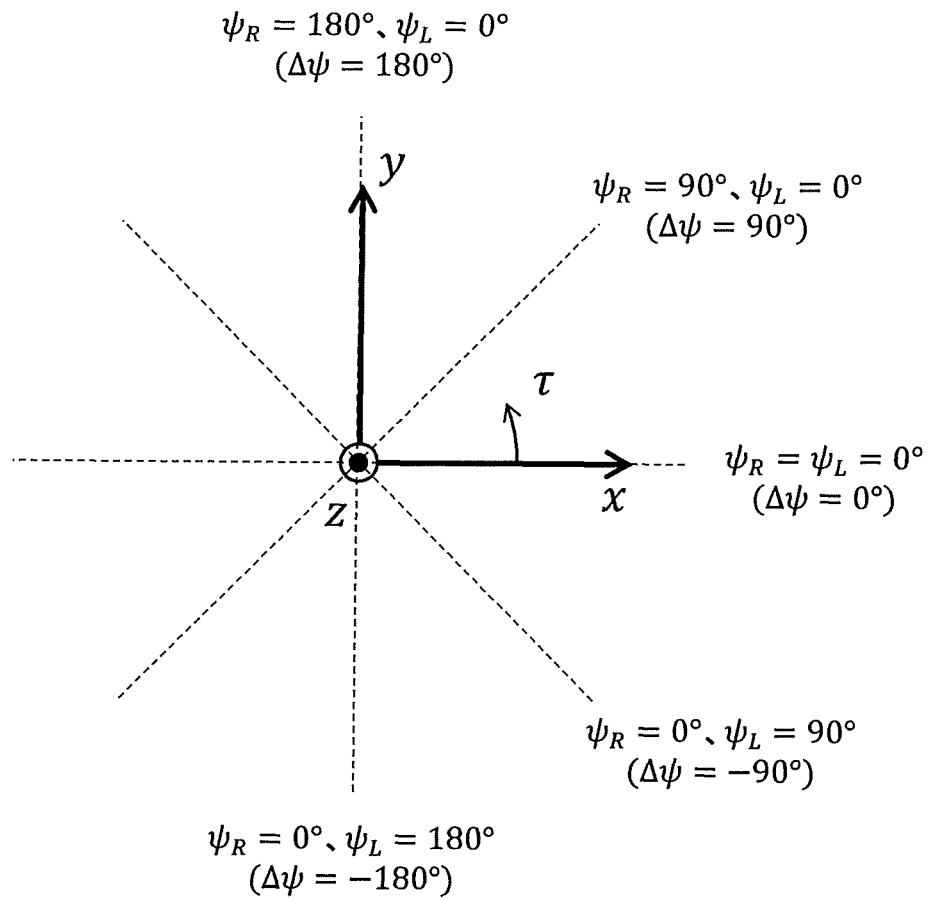
FIG. 2 is a diagram to explain a polarization angle.

FIG. 2 is a diagram to explain the polarization angle. A z-axis in FIG. 2 is set such that a direction from a far side to a near side on a paper surface is positive. In FIG. 2, "$\psi_L$" represents a phase of the left-hand circularly polarized wave, and "$\psi_R$" represents a phase of the right-hand circularly polarized wave. Further, "$\Delta\psi$" represents a difference between the phase of the left-hand circularly polarized wave and the phase of the right-hand circularly polarized wave, and is represented by a formula (1):

[Formula 1]

$$\Delta\psi = \psi_R - \psi_L \quad (1)$$

In FIG. 2, as an example, polarization planes in five combinations, namely, a combination in which the phases "$\psi_L$" and "$\psi_R$" are 0°, a combination in which the phase "$\psi_L$" is 0° and, the phase "$\psi_R$" is 90°, a combination in which the phase "$\psi_L$" is 0° and the phase "$\psi_R$" is 180°, a combination in which the phase "$\psi_L$" is 90° and the phase "$\psi_R$" is 0°, and a combination in which the phase "$\psi_L$" is 1800 and the phase "$\psi_R$" is 0° are illustrated by dashed lines. The polarization plane is common to the combination in which the phase "$\psi_L$" is 0° and the phase "$\psi_R$" is 180° and the combination in which the phase "$\psi_L$" is 180° and the phase "$\psi_R$" is 0°. Further, in FIG. 2, an angle formed by an x-axis and the polarization plane is referred to as a polarization angle represented by "$\tau$".

This is described below by formulae. A vector "$E_L$" representing the left-hand circularly polarized wave and a vector "$E_R$" representing the right-hand circularly polarized wave that each have an amplitude "$E_0$" and propagate in the positive direction of the z-axis described in FIG. 2 are respectively represented by a formula (2) and a formula (3):

[Formula 2]

$$\vec{E_L} = \frac{E_0}{\sqrt{2}} \mathrm{Re}[e^{j(\omega t - kz + \psi_L)}(\hat{x} + j\hat{y})] \quad (2)$$

[Formula 3]

$$\vec{E_R} = \frac{E_0}{\sqrt{2}} \mathrm{Re}[e^{j(\omega t - kz + \psi_R)}(\hat{x} + j\hat{y})] \quad (3)$$

Here, "$\omega$" indicates an angular frequency, "t" indicates a time, "k" indicates a wavenumber, "$\hat{x}$" indicates a unit vector in the x-axis, and "$\hat{y}$" indicates a unit vector in the y-axis. A sum of the vector "$E_L$" and the vector "$E_R$" is represented by a formula (4) from the formulae (1), (2), and (3):

[Formula 4]

$$\vec{E_L} + \vec{E_R} = \sqrt{2}\, E_0 \cos\left(\omega t - kz + \frac{\psi_L + \psi_R}{2}\right)\left[\cos\left(\frac{\Delta\psi}{2}\right)\hat{x} + \sin\left(\frac{\Delta\psi}{2}\right)\hat{y}\right] \quad (4)$$

In the formula (2) and the formula (3), the amplitude of the vector "$E_L$" and the amplitude of the vector "$E_R$" are equal to each other. Accordingly, the formula (4) represents the linearly polarized wave. At this time, the polarization angle "$\tau$" of the linearly polarized wave is represented by a formula (5):

[Formula 5]

$$\tau = \frac{\Delta\psi}{2} = \frac{\psi_R - \psi_L}{2} \quad (5)$$

The formula (5) represents that changing the phase difference "$\Delta\psi$" between the left-handed circularly polarized wave and the right-hand circularly polarized wave makes it possible to change the polarization angle "$\tau$" of the linearly polarized wave. Further, as illustrated in FIG. 2, the polarization plane is common to the combination in which the phase "$\psi_L$" is 0° and the phase "$\psi_R$" is 180° and the combination in which the phase "$\psi_L$" is 180° and the phase "$\psi_R$" is 0°. Accordingly, when the phase difference "$\Delta\psi$" can take a value between −180° and 180°, it is possible to handle any polarization angle "$\tau$". In other words, when a shiftable range of the phase by each of the phase shifters is larger than or equal to 180°, it is possible to handle any polarization angle "$\tau$".

As described above, sum of the left-hand circularly polarized wave and the right-hand circularly polarized wave generates the linearly polarized wave, and the polarization angle "$\tau$" of the linearly polarized wave is changeable. It is known that sum of the left-hand circularly polarized wave and the right-hand circularly polarized wave different in amplitude generates an elliptically polarized wave. Description that the polarization angle of the elliptically polarized wave is changeable as with the polarization angle "$\tau$" of the linearly polarized wave is given below.

First, a ratio "$\rho$" of the amplitude of the left-hand circularly polarized wave and the amplitude of the right-hand circularly polarized wave is represented by a formula (6):

[Formula 6]

$$\rho = |\vec{E_R}|/|\vec{E_L}| \quad (6)$$

When the vector "$E_L$" and the vector "$E_R$" respectively represented by the formula (2) and the formula (3) are represented using the formula (6), a formula (7) and a formula (8) are obtained:

[Formula 7]
$$\vec{E_L} = \frac{E_0}{\sqrt{1+\rho^2}} \text{Re}[e^{j(\omega t - kz + \psi_L)}(\hat{x} + j\hat{y})] \quad (7)$$

[Formula 8]
$$\vec{E_R} = \frac{\rho E_0}{\sqrt{1+\rho^2}} \text{Re}[e^{j(\omega t - kz + \psi_R)}(\hat{x} + j\hat{y})] \quad (8)$$

When the vector "$E_L$" and the vector "$E_R$" are combined, a semi-major axis "a" and a semi-minor axis "b" of the elliptically polarized wave are respectively represented by a formula (9) and a formula (10):

[Formula 9]
$$a = \frac{1+\rho}{\sqrt{1+\rho^2}} E_0 \quad (9)$$

[Formula 10]
$$b = \frac{|1-\rho|}{\sqrt{1+\rho^2}} E_0 \quad (10)$$

It can be confirmed from the formula (9) and the formula (10) that, in a case where the ratio "$\rho$" is 1, namely, in a case where the amplitude of the left-hand circularly polarized wave and the amplitude of the right-hand circularly polarized wave are equal to each other, the linearly polarized wave having an amplitude "$E_0$" is obtained.

A major-axis component of the elliptically polarized wave is defined as a co-polarized wave, and a minor-axis component is defined as a cross-polarized wave. The XPD of the elliptically polarized wave is represented by a formula (11):

[Formula 11]
$$XPD = \frac{1+\rho}{|1-\rho|} \quad (11)$$

Bringing the ratio "$\rho$" close to 1 makes it possible to improve the XPD by the formula (11). The ratio "$\rho$" is the ratio of the amplitude of the left-hand circularly polarized wave and the amplitude of the right-hand circularly polarized wave, and the amplitude of the left-hand circularly polarized wave and the amplitude of the right-hand circularly polarized wave are varied depending on the insertion losses of the phase shifters. When the phase shift amounts to realize any polarization angle are determined such that the insertion losses of the phase shifters are equivalent to each other, the polarization angle is variable and the XPD can be further improved. As used herein, the term "equivalent" includes "substantially equivalent".

Although a range represented by the term "substantially equivalent" depends on the applied wireless system, the range can be calculated from the formula (11). The difference of the insertion loss allowed for the phase shifter for the left-hand circularly polarized wave and the phase shifter for the right-hand circularly polarized wave is calculated based on the value of the XPD. When the difference of the insertion loss between the two phase shifters is lower than or equal to the calculated difference, the insertion losses of the two phase shifters are regarded to be substantially equivalent to each other.

For example, in a case of the wireless system in which the required XPD is larger than or equal to 30 dB, an absolute value of the difference of the insertion loss between the phase shifter for the left-hand circularly polarized wave and the phase shifter for the right-hand circularly polarized wave is lower than or equal to 0.5 dB. In this case, when the difference of the insertion loss between the phase shifter for the left-hand circularly polarized wave and the phase shifter for the right-hand circularly polarized wave is lower than or equal to 0.5 dB, the insertion losses of the two phase shifters are regarded to be substantially equivalent to each other.

When the polarization plane of the elliptically polarized wave is defined as a plane including the major axis, a polarization angle "$\tau_e$" of the elliptically polarized wave is represented by a formula (12):

[Formula 12]
$$\tau_e = \frac{\Delta\psi}{2} = \frac{\psi_R - \psi_L}{2} = \tau \quad (12)$$

As represented by the formula (12), the polarization angle "$\tau_e$" of the elliptically polarized wave is represented by the same formula as the formula for the polarization angle "$\tau$" of the linearly polarized wave. Accordingly, changing the phase difference "$\Delta\psi$" between the left-handed circularly polarized wave and the right-hand circularly polarized wave makes it possible to change the polarization angle "$\tau_e$" of the elliptically polarized wave as with the polarization angle "$\tau$" of the linearly polarized wave.

It has been described above that the polarization angle "$\tau_e$" of the elliptically polarized wave is changeable as with the polarization angle "$\tau$" of the linearly polarized wave. In the following, the elliptically polarized wave is included in the linearly polarized wave, unless otherwise noted.

A configuration of the antenna apparatus 100 according to the present embodiment is described below. The antenna apparatus 100 illustrated in FIG. 1 includes an antenna element 101, phase shifters 102a and 102b, a control circuit 103, a divider/combiner circuit 104, and a coupling circuit 105.

To transmit the linearly polarized wave from the antenna apparatus 100, the control circuit 103 determines the polarization angle "$\tau$", and determines the phase shift amounts at which the polarization angle "$\tau$" is realized. The divider/combiner circuit 104 divides a signal transmitted from a connection point 110 into the left-hand circularly polarized signal and the right-hand circularly polarized signal, and outputs the left-hand circularly polarized signal and the right-hand circularly polarized signal respectively to the phase shifters 102a and 102b. The phase shifters 102a and 102b respectively shift the phase of the left-hand circularly polarized signal and the phase of the right-hand circularly polarized signal by the instructed phase shift amounts, and output the resultant signals to the antenna element 101. The antenna element 101 radiates the left-hand circularly polarized wave and the right-hand circularly polarized wave respectively from the phase-shifted left-hand circularly polarized signal and the phase-shifted right-hand circularly polarized signal. The antenna element 101 radiates the linearly polarized wave of the polarization angle "$\tau$" by simultaneously transmitting the left-hand circularly polarized wave and the right-hand circularly polarized wave.

In a case where the antenna apparatus 100 receives the linearly polarized wave of the polarization angle "$\tau$", each of the phase shifters 102a and 102b first shifts the phase by the preset phase shift amount, and then changes the phase shift amount to a phase shift amount corresponding to the polarization angle "τ" transmitted from the control circuit 103.

The antenna element 101 outputs the left-hand circularly polarized signal and the right-hand circularly polarized signal respectively to the phase shifters 102a and 102b. Each of the phase shifters 102a and 102b shifts the phase of the corresponding signal by the preset phase shift amount, and outputs the resultant signal to the divider/combiner circuit 104. The divider/combiner circuit 104 combines the phase-shifted left-hand circularly polarized signal and the phase-shifted right-hand circularly polarized signal to a combined signal (hereinafter, combined signal is referred to as received signal), and outputs the received signal to the control circuit 103 and the connection point 110. The control circuit 103 determines the phase shift amounts corresponding to the polarization angle "τ" of the received linearly polarized wave based on power of the input received signal, and changes the phase shift amounts of the phase shifters 102a and 102b.

The antenna element 101 is connected to the phase shifters 102a and 102b. The phase shifters 102a and 102b are each connected to the antenna element 101 and the divider/combiner circuit 104. The divider/combiner circuit 104 is connected to the phase shifters 102a and 102b and the coupling circuit 105. The coupling circuit 105 is connected to the control circuit 103 and the divider/combiner circuit 104. The control circuit 103 is connected to the coupling circuit 105. It is sufficient for the control circuit 103 to transmit an instruction relating to phase shift by the phase shifters 102a and 102b, and a transmission method is freely-selected. Examples of the transmission method include wired transmission, wireless transmission, transmission using change of a magnetic field, and mechanical transmission through the other device.

At the connection point 110, the antenna apparatus 100 and the other device (not illustrated) are connected to each other. The other device may be an acquisition source of the signal to be transmitted by the antenna apparatus 100 or a device as a transmission destination of the signal received by the antenna apparatus 100. Examples of the other device include an information processing device (signal processing device) and a wireless power supply device.

The antenna element 101 radiates and receives the left-hand circularly polarized wave and the right-hand circularly polarized wave. More specifically, when the left-hand circularly polarized signal is input to the antenna element 101, the antenna element 101 radiates the left-hand circularly polarized wave. When the right-hand circularly polarized signal is input to the antenna element 101, the antenna element 101 radiates the right-hand circularly polarized wave. When the left-hand circularly polarized signal and the right-hand circularly polarized signal that are equivalent in amplitude and frequency to each other are simultaneously input to the antenna element 101, the antenna element 101 radiates the linearly polarized wave. As used herein, the term "simultaneously" includes "substantially simultaneously".

Upon receiving the left-hand circularly polarized wave, the antenna element 101 outputs the left-hand circularly polarized signal. Upon receiving the right-hand circularly polarized wave, the antenna element 101 outputs the right-hand circularly polarized signal. Upon receiving the linearly polarized wave, the antenna element 101 outputs the left-hand circularly polarized signal and the right-hand circularly polarized signal that are equivalent in amplitude to each other.

The antenna element 101 may have any configuration as long as the antenna element 101 can radiates and receive the left-hand circularly polarized wave and the right-hand circularly polarized wave. In the present embodiment, as an example, a square patch antenna with two truncated corners representing perturbation elements is illustrated in FIG. 1.

The phase shifters 102a and 102b each shift the phase by delaying the phase of the corresponding circularly polarized signal. More specifically, in signal transmission, the phase shifter 102a shifts the phase of the left-hand circularly polarized signal input from the divider/combiner circuit 104 to output the resultant signal to the antenna element 101, and the phase shifter 102b shifts the phase of the right-hand circularly polarized signal input from the divider/combiner circuit 104 to output the resultant signal to the antenna element 101. In signal reception, the phase shifter 102a shifts the phase of the left-hand circularly polarized signal input from the antenna element 101 to output the resultant signal to the divider/combiner circuit 104, and the phase shifter 102b shifts the phase of the right-hand circularly polarized signal input from the antenna element 101 to output the resultant signal to the divider/combiner circuit 104.

The phase shift amounts of the phase shifters 102a and 102b are instructed by the control circuit 103. Further, a shiftable range of the phase by each of the phase shifters 102a and 102b is larger than or equal to 180°, and it is possible to handle any polarization angle "τ".

The phase shifters 102a and 102b each may have any configuration as long as the phase shifters 102a and 102b can respectively shift the phase of the left-hand circularly polarized signal and the phase of the right-hand circularly polarized signal. The phase shifters 102a and 102b may have different configurations. In the present embodiment, as an example, the phase shifters 102a and 102b are each an analog phase shifter that can continuously change the phase shift amount, and are identical to each other.

The control circuit 103 determines the phase shift amounts of the phase shifters 102a and 102b. The control circuit 103 holds information representing relationship of the insertion loss of the phase shifter 102a, the insertion loss of the phase shifter 102b, and the phase shift amounts, in a storage (not illustrated). The control circuit 103 determines the phase shift amounts that corresponds to the polarization angle "τ" of the linearly polarized wave and makes the insertion loss of the phase shifter 102a and the insertion loss of the phase shifter 102b equivalent to each other, based on the information.

The storage is a memory or the like. Examples of the memory include a RAM (random access memory), a ROM (read-only memory), a PROM (programmable ROM), an EPROM (erasable PROM), an EEPROM (electrically EPROM), a flash memory, and a register. The storage may be provided inside or outside the antenna apparatus 100. In the present embodiment, as an example, the storage is provided inside the control circuit 103.

Further, the control circuit 103 can measure power of the input signal. In reception, the control circuit 103 determines the phase shift amounts of the phase shifters 102a and 102b further based on the power of the signal. The determined phase shift amounts are transmitted to the respective phase shifters 102a and 102b.

More specifically, in signal transmission, the control circuit 103 determines the polarization angle "τ", and determines the phase shift amounts the phase shifters 102a and 102*b* at which the phase difference "ψ" necessary for the polarization angle "τ" is satisfied and the insertion losses are equivalent to each other.

In signal reception, the control circuit 103 measures the power of the input signal. The control circuit 103 changes the phase shift amounts of the phase shifters 102*a* and 102*b* so as to increase the power of the input signal. The control circuit 103 provides a threshold for the power of the signal (hereinafter, also referred to as power threshold). The control circuit 103 determines the phase shift amounts of the phase shifters 102*a* and 102*b* at which the power threshold is satisfied and the insertion losses are equivalent to each other. Further, the control circuit 103 can estimate the polarization angle "τ" of each of the left-hand circularly polarized wave and the right-hand circularly polarized wave received by the antenna element 101, from the phase shift amounts of the phase shifters 102*a* and 102*b* determined in signal reception.

The control circuit 103 is an electronic circuit (processor) including a control device and a calculation device of hardware. Examples of the processor include a general-purpose processor, a central processing unit (CPU), a microprocessor, a digital signal processor (DSP), and a combination thereof.

The divider/combiner circuit 104 divides one signal into two signals, and combines two signals to one signal. More specifically, in signal transmission, the divider/combiner circuit 104 divides the signal input from the device connected to the antenna apparatus 100 through the connection point 110, into the left-hand circularly polarized signal and the right-hand circularly polarized signal, and outputs the left-hand circularly polarized signal and the right-hand circularly polarized signal. The divided left-hand circularly polarized signal and the divided right-hand circularly polarized signal are equivalent in amplitude to each other. In signal reception, the divider/combiner circuit 104 combines the input left-hand circularly polarized signal and the input right-hand circularly polarized signal and outputs the combined signal.

The coupling circuit 105 outputs a part of the input signal from a different terminal. More specifically, in signal reception, when the signal combined by the divider/combiner circuit 104 is input to the coupling circuit 105, the coupling circuit 105 outputs a part of the signal to the control circuit 103, and outputs a remaining signal to the device as a transmission destination through the connection point 110. Note that the coupling circuit 105 outputs the signal input from the connection point 110 to the divider/combiner circuit 104.

The components of the antenna apparatus 100 have been described above. The antenna apparatus 100 may be mounted by an IC (integrated circuit), an LSI (large scale integration), or the like. The components may be collectively mounted on one chip, or a part of the components may be mounted on the other chip.

The antenna apparatus 100 is an apparatus that shifts the phase of the left-hand circularly polarized signal and the phase of the right-hand circularly polarized signal based on the insertion losses of the respective phase shifters 102*a* and 102*b*. Operation by the antenna apparatus 100 in signal transmission is described with reference to FIG. 3 to FIG. 5.

Figure 3:
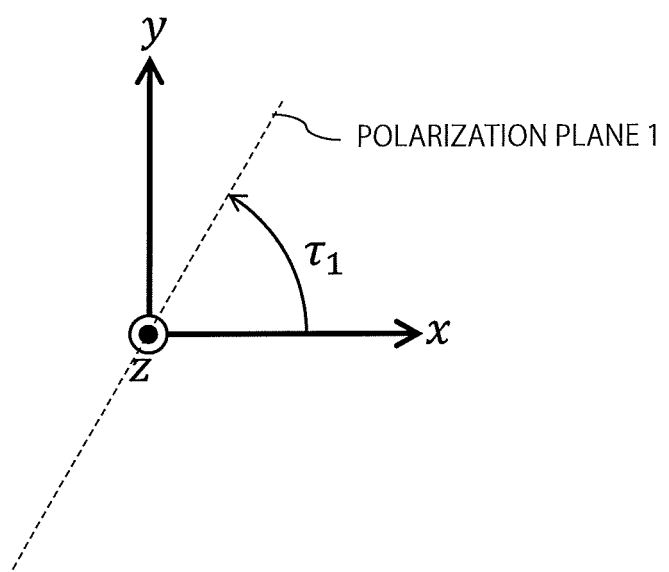
FIG. 3 is a diagram illustrating a polarization angle "$\tau_1$" according to the first embodiment.

As described above, the antenna apparatus 100 is an apparatus that can transmit the linearly polarized wave at any polarization angle. As an example, operation by the antenna apparatus 100 that transmits the linearly polarized wave of the polarization angle "$\tau_1$" illustrated in FIG. 3 is described with reference to steps S101 to S103 in FIG. 4.

An outline of steps S101 to S103 is described below.

The antenna apparatus 100 determines the polarization angle ("$\tau_1$" in present embodiment) of the linearly polarized wave to be transmitted, and determines the phase shift amount (hereinafter, referred to as phase shift amount "$\phi_1$") of the phase shifter 102*a* and the phase shift amount (hereinafter, referred to as phase shift amount "$\phi_2$") of the phase shifter 102*b* satisfying the polarization angle "$\tau_1$", based on the insertion losses of the phase shifters 102*a* and 102*b*, and instructs the phase shift amounts. The antenna apparatus 100 transmits the left-hand circularly polarized wave and the right-hand circularly polarized wave at the respective set phase shift amounts "$\phi_1$" and "$\phi_2$" to transmit the linearly polarized wave of the polarization angle "$\tau_1$".

Figure 4:
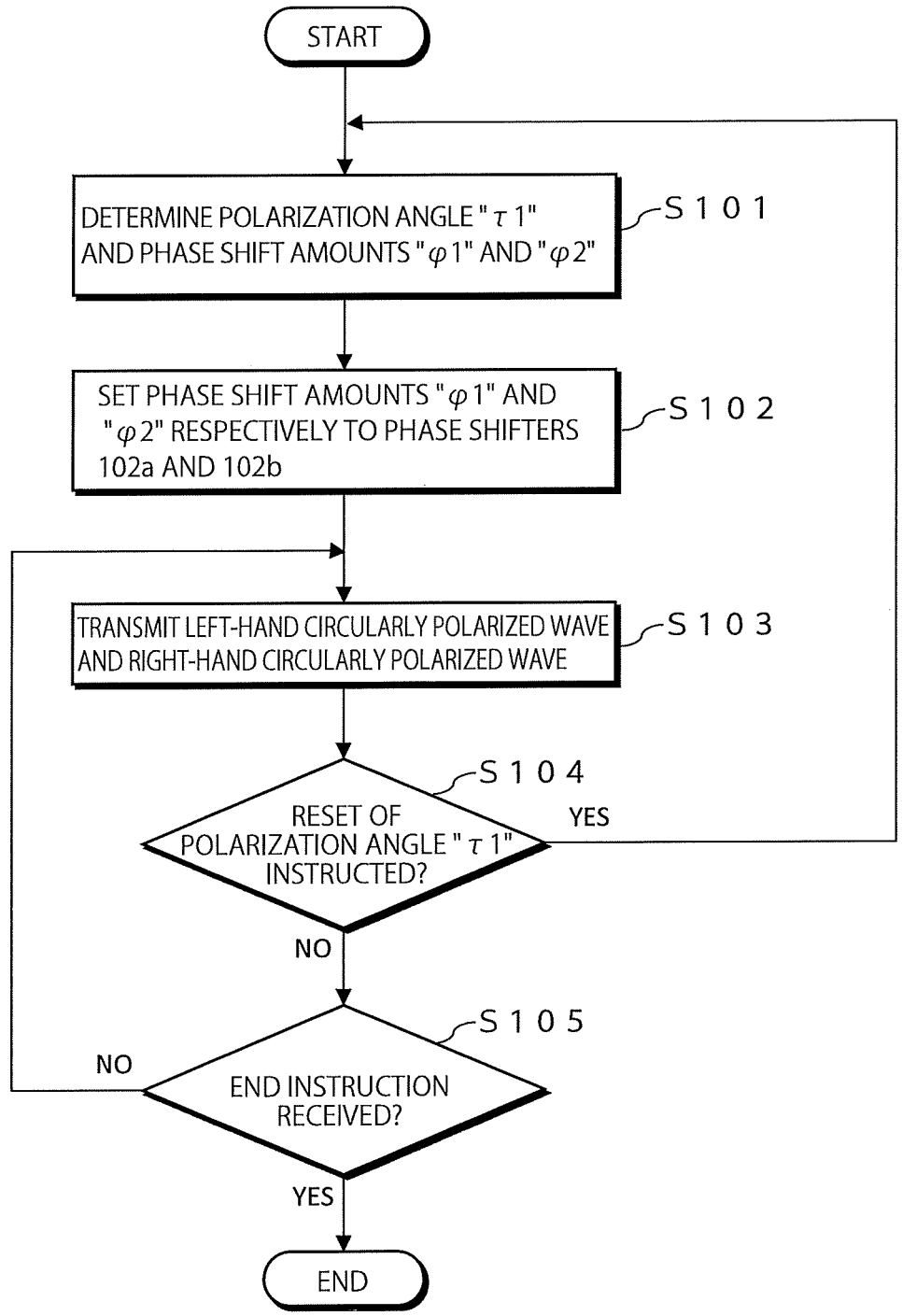
FIG. 4 is a flowchart illustrating transmission by the antenna apparatus 100.

The operation by the antenna apparatus 100 in signal transmission is described below along a flowchart of FIG. 4 with reference to FIG. 3 to FIG. 5. The control circuit 103 determines the polarization angle "$\tau_1$" of the linearly polarized wave to be transmitted. The control circuit 103 determines the phase shift amounts "$\phi_1$" and "$\phi_2$" corresponding to the polarization angle "$\tau_1$", based on information (hereinafter, also referred to as characteristic information) representing the insertion losses and the phase shift amounts of the phase shifters 102*a* and 102*b* (step S101).

Figure 5:
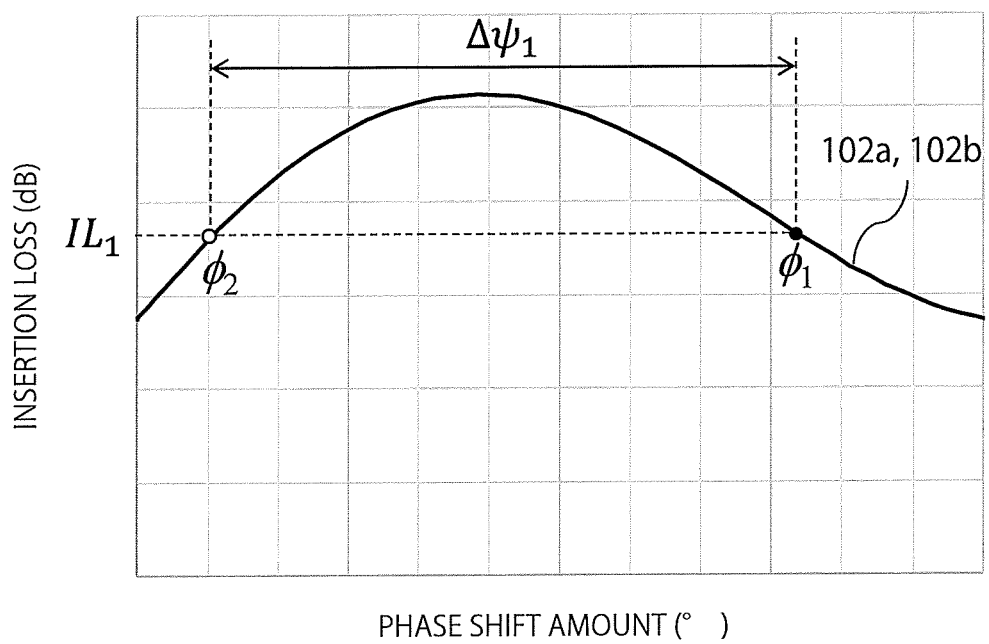
FIG. 5 is a diagram to explain an example of phase shift amounts of phase shifters 102a and 102b.

As an example, FIG. 5 illustrates the insertion losses of the phase shifters 102*a* and 102*b*. The insertion loss is varied depending on a type of the phase shifter, and is varied depending on the phase shift amount even in the similar phase shifter. In the present embodiment, since the phase shifters 102*a* and 102*b* are identical phase shifters, the insertion losses of the phase shifters 102*a* and 102*b* are represented by the similar insertion losses. The control circuit 103 holds the characteristic information representing the relationship of the insertion losses and the phase shift amounts, in the internal storage. The control circuit 103 determines the phase shift amounts "$\phi_1$" and "$\phi_2$" that has the phase difference corresponding to the polarization angle "$\tau_1$" and makes the inversion losses of the phase shifters 102*a* and 102*b* equivalent to each other, based on the characteristic information. The phase shift amounts "$\phi_1$" and "$\phi_2$" having the phase difference corresponding to the polarization angle "$\tau_1$" satisfy a formula (13):

[Formula 13]

$$\Delta\psi_1 = \phi_1 - \phi_2 = 2\tau_1 \tag{13}$$

Note that, in the present embodiment, as an example, the phase shift amounts "$\phi_1$" and "$\phi_2$" each similarly causes insertion loss "$IL_1$". It is sufficient that the insertion losses of the phase shifters 102*a* and 102*b* are substantially equivalent to each other, and the insertion losses are not limited to specific values.

Further, in the present embodiment, the left-hand circularly polarized signal and the right-hand circularly polarized signal divided by the divider/combiner circuit 104 have a similar phase.

The control circuit 103 transmits the determined phase shift amounts "$\phi_1$" and "$\phi_2$" respectively to the phase shifters 102*a* and 102*b*. The phase shifters 102*a* and 102*b* respectively set the transmitted phase shift amounts "$\phi_1$" and "$\phi_2$" (step S102).

The antenna element 101 radiates the left-hand circularly polarized wave and the right-hand circularly polarized wave based on the left-hand circularly polarized signal and the right-hand circularly polarized signal respectively subjected to the phase shift by the phase shifters 102a and 102b, thereby transmitting the linearly polarized wave, (step S103).

More specifically, a signal (hereinafter, also referred to as transmission signal) to be transmitted is input to the divider/combiner circuit 104 from the device connected to the antenna apparatus 100. The divider/combiner circuit 104 divides the transmission signal into the left-hand circularly polarized signal and the right-hand circularly polarized signal. In the present embodiment, as an example, the left-hand circularly polarized signal and the right-hand circularly polarized signal are divided with the similar amplitude and the similar phase. The left-hand circularly polarized signal is input to the phase shifter 102a, and the right-hand circularly polarized signal is input to the phase shifter 102b.

The phase shifter 102a shifts the phase of the input left-hand circularly polarized signal by the phase shift amount "$\phi_1$", and outputs the resultant signal to the antenna element 101. The phase shifter 102b shifts the phase of the input right-hand circularly polarized signal by the phase shift amount "$\phi_2$", and outputs the resultant signal to the antenna element 101. The antenna element 101 radiates the left-hand circularly polarized signal and the right-hand circularly polarized signal respectively input from the phase shifters 102a and 102b, as the left-hand circularly polarized wave and the right-hand circularly polarized wave. In the present embodiment, the antenna element 101 simultaneously radiates the left-hand circularly polarized wave and the right-hand circularly polarized wave, as the linearly polarized wave.

Thereafter, the antenna apparatus 100 divides the transmission signal into the left-hand circularly polarized signal and the right-hand circularly polarized signal. The antenna apparatus 100 shifts the phase of the divided left-hand circularly polarized signal by the phase shift amount "$\phi_1$", and shifts the phase of the divided right-hand circularly polarized signal by the phase shift amount "$\phi_2$". The antenna apparatus 100 transmits the phase-shifted left-hand circularly polarized signal and the phase-shifted right-hand circularly polarized signal, as the linearly polarized wave. The antenna apparatus 100 continuously performs the operation.

The control circuit 103 checks whether a reset instruction to reset (change) the polarization angle "$\tau_1$" of the linearly polarized wave to be radiated from the antenna element 101 has been received (step S104). The reset instruction is notified to the control circuit 103 through user input to the antenna apparatus 100, acquisition of a signal including the reset instruction by the antenna apparatus 100, or the like.

In a case where the control circuit 103 has received the reset instruction (Yes in step S104), the processing returns to step S101, and the control circuit 103 determines the polarization angle "$\tau_1$" and the phase shift amounts "$\phi_1$" and "$\phi_2$" again. In a case where the reset instruction includes designation of the polarization angle, the control circuit 103 determines the phase shift amount of the phase shifter 102a and the phase shift amount of the phase shifter 102b again based on the designated polarization angle.

In contrast, in a case where the control circuit 103 has not received the reset instruction (No in step S104), the control circuit 103 checks whether an end instruction to end the operation of the antenna apparatus 100 has been received (step S105). The end instruction is an instruction to end the operation of the antenna apparatus 100 by this flow. The end instruction is notified to the control circuit 103 through user input to the antenna apparatus 100, acquisition of a signal including the end instruction by the antenna apparatus 100, or the like. The end instruction may be an instruction to immediately end the operation of the antenna apparatus 100.

In a case where the control circuit 103 has not received the end instruction (No in step S105), the processing returns to step S103, and the antenna apparatus 100 continues transmission of the linearly polarized wave. In contrast, in a case where the control circuit 103 has received the end instruction (Yes in step S105), the flow ends, and the antenna apparatus 100 ends the operation.

The operation by the antenna apparatus 100 in signal transmission has been described above. Operation by the antenna apparatus 100 in signal reception is described below with reference to FIG. 3 to FIG. 6.

As described above, the antenna apparatus 100 is an apparatus that can receive the linearly polarized wave of any polarization angle. As an example, the operation by the antenna apparatus 100 that receives the linearly polarized wave of the polarization angle "$\tau_1$" illustrated in FIG. 3 is described with reference to steps S111 to S115 in FIG. 6. As with signal transmission, the phase shift amount of the phase shifter 102a and the phase shift amount of the phase shifter 102b corresponding to the polarization angle "$\tau_1$" are respectively represented by "$\phi_1$" and "$\phi_2$".

An outline of steps S111 to S115 is described below. The antenna apparatus 100 receives, as the linearly polarized wave, the left-hand circularly polarized wave and the right-hand circularly polarized wave, and outputs the left-hand circularly polarized signal representing the received left-hand circularly polarized wave and the right-hand circularly polarized signal representing the received right-hand circularly polarized wave. The antenna apparatus 100 combines the left-hand circularly polarized signal and the right-hand circularly polarized signal. The antenna apparatus 100 determines the phase shift amounts "$\phi_1$" and "$\phi_2$" based on the power of the received signal and the insertion losses of the phase shifters 102a and 102b, and instructs the phase shift amounts "$\phi_1$" and "$\phi_2$". The antenna apparatus 100 receives the left-hand circularly polarized wave and the right-hand circularly polarized wave at the respective set phase shift amounts "$\phi_1$" and "$\phi_2$", and combines the received signal.

Note that the insertion losses of the phase shifters 102a and 102b are similar to the insertion losses illustrated in FIG. 5. In other words, the case where the phase shifters 102a and 102b are identical phase shifters is described as an example. Further, in the present embodiment, as an example, the received left-hand circularly polarized signal and the received right-hand circularly polarized signal have the similar phase. The phase shift amount of the phase shifter 102a and the phase shift amount of the phase shifter 102b are set in advance.

Figure 6:
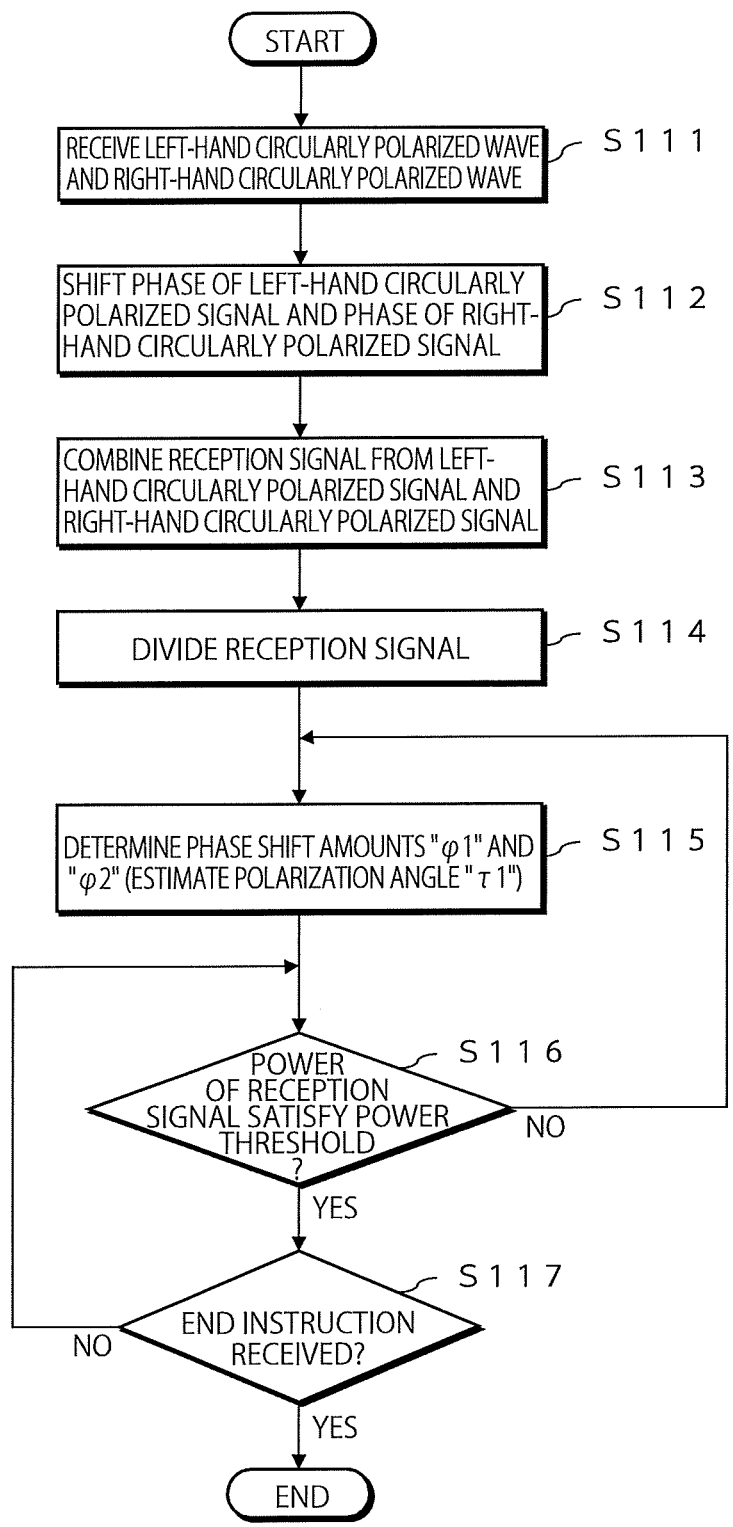
FIG. 6 is a flowchart illustrating reception by the antenna apparatus 100.

The operation by the antenna apparatus 100 in signal reception is described below along a flowchart of FIG. 6.

The antenna element 101 receives the left-hand circularly polarized wave and the right-hand circularly polarized wave (step S111). The antenna element 101 outputs the left-hand circularly polarized wave as the left-hand circularly polarized signal to the phase shifter 102a, and outputs the right-hand circularly polarized wave as the right-hand circularly polarized signal to the phase shifter 102b. In the present embodiment, the antenna element 101 receives the linearly polarized wave that is obtained through sum of the left-hand circularly polarized wave and the right-hand circularly polarized wave in a manner similar to the above description, and outputs the linearly polarized wave as the left-hand circularly polarized signal and the right-hand circularly polarized signal.

The phase shifters 102a and 102b respectively shifts the phase of the left-hand circularly polarized signal and the phase of the right-hand circularly polarized signal by the set phase shift amounts (step S112). As an example, the phase shifters 102a and 102b respectively shifts the phase of the left-hand circularly polarized signal and the phase of the right-hand circularly polarized signal by the preset phase shift amounts. The phase shifters 102a and 102b respectively output the phase-shifted left-hand circularly polarized signal and the phase-shifted right-hand circularly polarized signal to the divider/combiner circuit 104.

The divider/combiner circuit 104 combines the received signal from the input left-hand circularly polarized signal and the input right-hand circularly polarized signal (step S113). The divider/combiner circuit 104 outputs the combined received signal to the coupling circuit 105.

The coupling circuit 105 divides the input received signal, and outputs the divided received signals to the control circuit 103 and the connection point 110 (step S114). The received signal output to the connection point 110 is input to the device connected to the antenna apparatus 100.

Steps S111 to S114 described above are continuously performed irrespective of setting of the phase shift amounts of the phase shifters 102a and 102b.

The control circuit 103 determines the phase shift amounts "$\phi_1$" and "$\phi_2$" having the phase difference corresponding to the polarization angle "$\tau_1$" of the received linearly polarized wave, based on the characteristic information that represents the insertion losses and the phase shift amounts of the phase shifters 102a and 102b, and the power of the input received signal (step S115). As an example, the control circuit 103 determines the phase shift amounts "$\phi_1$" and "$\phi_2$" that satisfy a formula (13) and make the insertion losses of the phase shifters 102a and 102b equivalent to each other.

More specifically, the control circuit 103 measures the power of the input received signal. The control circuit 103 holds in advance a plurality of sets of phase shift amounts of the phase shifters 102a and 102b having the phase differences corresponding to various polarization angles, in the internal storage. Each of the sets of phase shift amounts is set so as to make the insertion losses of the phase shifters 102a and 102b substantially equivalent to each other, based on the characteristic information of the phase shifters 102a and 102b.

The control circuit 103 determines a set at which the power of the received signal satisfies the power threshold, from the plurality of sets of phase shift amounts. In the present embodiment, since the polarization angle of the received linearly polarized wave is "$\tau_1$", the control circuit 103 determines the set of phase shift amounts "$\phi_1$" and "$\phi_2$", and changes the preset phase shift amounts to the phase shift amounts "$\phi_1$" and "$\phi_2$". Thereafter, processing in step S112 is performed using the phase shift amounts "$\phi_1$" and "$\phi_2$".

The control circuit 103 measures the power of the input received signal after the step. The control circuit 103 checks whether the power of the received signal satisfies the power threshold (step S116). In a case where the power of the received signal does not satisfy the power threshold (No in step S116), the processing returns to step S115. This is because the polarization angle "$\tau$" of the received linearly polarized wave may be changed from "$\tau_1$", and it is necessary to determine the phase shift amounts of the phase shifters 102a and 102b again.

In contrast, in a case where the power of the received signal satisfies the power threshold (Yes in step S116), the control circuit 103 checks whether the end instruction to end the operation of the antenna apparatus 100 has been received (step S117). The end instruction is an instruction to end the operation of the antenna apparatus 100 by this flow. The end instruction is notified to the control circuit 103 through user input to the antenna apparatus 100, acquisition of a signal including the end instruction by the antenna apparatus 100, or the like. The end instruction may be an instruction to immediately end the operation of the antenna apparatus 100.

In a case where the control circuit 103 has not received the end instruction (No in step S117), the processing returns to step S114, and the antenna apparatus 100 continues reception of the linearly polarized wave. In contrast, in a case where the control circuit 103 has received the end instruction (Yes in step S117), the flow ends, and the antenna apparatus 100 ends the operation.

The operation by the antenna apparatus 100 in transmission and reception has been described above, and the present embodiment has been described. Various modifications of the antenna apparatus 100 can be mounted and implemented. Modifications of the configuration and the operation of the antenna apparatus 100 are described below.

In the present embodiment, the antenna element 101 is the square patch antenna with the truncated corners as the perturbation elements. As a modification, the antenna element 101 may be an antenna different from the antenna described in the present embodiment. Examples of the antenna include a combination of a dual-orthogonal polarized patch antenna and a circuit such as a quadrature hybrid coupler, a dipole antenna, a helical antenna, a spiral antenna, a loop antenna, a dielectric resonator antenna, an antenna using a waveguide provided with a septum polarizer or an orthogonal mode transducer, a slot antenna, a reflector antenna, a lens antenna, and an antenna using a metasurface. Further, the antenna may be an array antenna in which a plurality of the above-described antennae are arrayed. The antenna may be a sequential array antenna that excites a plurality of antennae for linearly polarized waves while imparting a phase difference to the plurality of antennae, thereby generating a circularly polarized wave.

In the present embodiment, the analog phase shifter is used as each of the phase shifters 102a and 102b. As a modification, a digital phase shifter that discretely switches the phase shift amount may be used, or a plurality of phase shifters may be combined to configure each of the phase shifters 102a and 102b. Specific examples of each of the phase shifters 102a and 102b include a phase shifter that can switch a length of a line connected to the phase shifter by a PIN diode, an FET (field-effect transistor) switch, a MEMS (micro electromechanical systems) switch, or the like. A reflection-type phase shifter that is obtained by combining phase shifters that can switch the length of the line and a circuit such as a quadrature hybrid coupler may be used as each of the phase shifters 102a and 102b. A variable impedance element such as a varactor diode may be used as each of the phase shifters 102a and 102b.

Further, in the present embodiment, the phase shifters 102a and 102b have been described as identical phase shifters; however, the phase shifters 102a and 102b may be different phase shifters as a modification. A case where the phase shifters 102a and 102b have different configurations is described with reference to FIG. 7. The different configuration indicates that the insertion losses by the phase shift amounts are different between the phase shifters 102a and 102b. Note that the case where the linearly polarized wave of the polarization angle "$\tau_1$" is transmitted and received is described as with the present embodiment.

Figure 7:
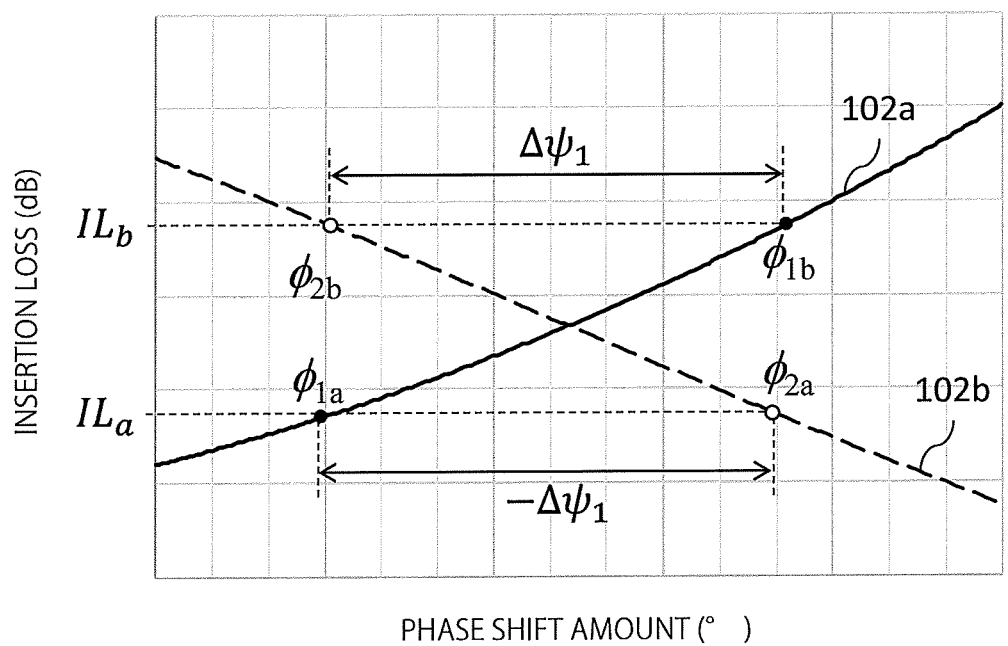
FIG. 7 is a diagram to explain an example in which the phase shift amounts of the phase shifters 102a and 102b are different from each other.

FIG. 7 is a diagram illustrating the phase shift amounts and the insertion losses of the phase shifters 102a and 102b.

The relationship between the phase shift amount and the insertion loss of the phase shifter 102a is illustrated by a solid line, and the relationship between the phase shift amount and the insertion loss of the phase shifter 102b is illustrated by a dashed line. As with the present embodiment, the difference between the phase shift amount of the phase shifter 102a and the phase shift amount of the phase shifter 102b to transmit and receive the linearly polarized wave of the polarization angle "$\tau_1$" is "$\Delta\psi_1$".

Even in the case where the phase shifters 102a and 102b have different configurations, the control circuit 103 determines the phase shift amounts that satisfy the difference "$\Delta\psi_1$" of the phase shift amounts and make the insertion losses of the phase shifters 102a and 102b equivalent to each other. As the phase shift amounts satisfying the formula (13), phase shift amounts "$\phi_{1b}$" and "$\phi_{2b}$" are determined. The insertion losses of the phase shifters 102a and 102b in this case are both "$IL_b$".

Note that, in the case where the control circuit 103 determines the phase shift amounts that satisfy an absolute value of the difference "$\Delta\psi_1$" of the phase shift amounts and make the insertion losses of the phase shifters 102a and 102b equivalent to each other, the polarization angle becomes "$-\tau_1$" from the formula (13) because the difference between the phase shift amounts "$\phi_1$" and "$\phi_2$" becomes a minus value. In this case, the phase shift amounts are "$\phi_{1a}$" and "$\phi_{2a}$", and the insertion losses of the phase shifters 102a and 102b are both "$IL_a$".

In the present embodiment, in signal reception, the phase shift amounts are set in advance to the phase shifters 102a and 102b. The phase shift amounts may be set at the time of manufacturing the phase shifters 102a and 102b, may be determined by the control circuit 103 and set by the phase shifters 102a and 102b, or may be set in response to an instruction, from a device connected to the antenna apparatus 100.

In the present embodiment, the control circuit 103 transmits the phase shift amounts to the phase shifters 102a and 102b. Any method is applicable to the transmission of the phase shift amounts. For example, the control circuit 103 may transmit the phase shift amounts by transmitting signals through wired connection or wireless connection. The control circuit 103 may transmit a signal to a device that generates a magnetic field, and causes the device to generate a magnetic field, thereby transmitting the phase shift amounts of the phase shifters 102a and 102b. The control circuit 103 may transmit a signal to a device that performs mechanical operation, and the device may mechanically set the phase shift amounts to the phase shifters 102a and 102b.

In the present embodiment, in signal reception, the control circuit 103 determines the phase shift amounts of the phase shifters 102a and 102b at which the power of the received signal input to the control circuit 103 satisfies the power threshold. As a modification, the control circuit 103 may hold a plurality of combinations of phase shift amounts of the phase shifters 102a and 102b, and measure the power of a signal at each of the combinations. The control circuit 103 may determine, as the phase shift amounts "$\phi_1$" and "$\phi_2$", a combination at which the power of the signal input to the control circuit 103 becomes the maximum, among the plurality of combinations. Note that the term "maximum" includes "submaximal".

In the present embodiment, the control circuit 103 determines the phase shift amounts "$\phi_1$" and "$\phi_2$" that make the insertion losses of the phase shifters 102a and 102b equivalent to each other. As a modification, in a case where the phase shift amounts that satisfy the difference "$\Delta\psi$" and make the insertion losses of the phase shifters 102a and 102b equivalent to, each other are not present, the control circuit 103 may determine the phase shift amounts of the phase shifters 102a and 102b so as to reduce the difference of the insertion loss between the phase shifters 102a and 102b. The control circuit 103 may set a threshold, and determine whether the difference of the insertion loss between the phase shifters 102a and 102b is smaller than the threshold.

In the present embodiment, the control circuit 103 determines the phase shift amounts "$\phi_1$" and "$\phi_2$" that make the insertion losses of the phase shifters 102a and 102b equivalent to each other. As a modification, the control circuit 103 may determine either one of the phase shift amounts "$\phi_1$" and "$\phi_2$" based on the insertion losses of the phase shifters 102a and 102b. For example, the phase shift amount "$\phi_1$" may be preset based on the insertion losses of the phase shifters 102a and 102b, and the phase shift amount "$\phi_2$" may be determined so as to make the insertion loss equivalent to the insertion loss at the phase shift amount "$\phi_1$".

In the present embodiment, the control circuit 103 determines the phase shift amounts "$\phi_1$" and "$\phi_2$" based on the characteristic information that represents the insertion losses and the phase shift amounts of the phase shifters 102a and 102b and is held in the internal storage. As a modification, the control circuit 103 may determine the phase shift amounts "$\phi_1$" and "$\phi_2$" based on change of the amplitude and the phase of the left-hand circularly polarized signal caused by the phase shift by the phase shifter 102a and change of the amplitude and the phase of the right-hand circularly polarized signal caused by the phase shift by the phase shifter 102b.

The left-hand circularly polarized signal input to the phase shifter 102a, the left-hand circularly polarized signal output from the phase shifter 102a, the right-hand circularly polarized signal input to the phase shifter 102b, and the right-hand circularly polarized signal output from the phase shifter 102b are each partially extracted by the coupling circuit, and the extracted parts are input to the control circuit 103. The control circuit 103 may calculate the change of the amplitude and the phase of the left-hand circularly polarized signal caused by the phase shift by the phase shifter 102a and the change of the amplitude and the phase of the right-hand circularly polarized signal caused by the phase shift by the phase shifter 102b, and determine the phase shift amounts "$\phi_1$" and "$\phi_2$" based on the calculated changes.

In the present embodiment, the divider/combiner circuit 104 is a circuit that divides the transmission signal into the left-hand circularly polarized signal and the right-hand circularly polarized signal, and combines the received left-hand circularly polarized signal and the received right-hand circularly polarized signal to the received signal. The divider/combiner circuit 104 is, for example, a T-junction circuit or a Wilkinson power divider.

In the present embodiment, the divider/combiner circuit 104 does not impart the phase difference when dividing the transmission signal into the left-hand circularly polarized signal and the right-hand circularly polarized signal. As a modification, the divider/combiner circuit 104 may impart the phase difference when dividing the transmission signal into the left-hand circularly polarized signal and the right-hand circularly polarized signal. In this case, the formula (13) is modified as follows:

[Formula 14]

$$\phi_1 - \phi_2 = 2\tau_1 + \alpha \qquad (14)$$

Here, "α" indicates a phase amount of the right-hand circularly polarized signal delayed from the left-hand circularly polarized signal. As represented in the formula (14), the control circuit 103 determines the phase shift amounts of the respective phase shifters 102a and 102b further based on the phase difference between the left-hand circularly polarized signal and the right-hand circularly polarized signal. Note that, in the case where the divider/combiner circuit 104 divides the transmission signal into the left-hand circularly polarized signal and the right-hand circularly polarized signal while imparting the phase difference, the divider/combiner circuit 104 transmits the phase difference to be imparted, to the control circuit 103.

Further, in a case where the divider/combiner circuit 104 combines signals while imparting the phase difference in signal reception, the divider/combiner circuit 104 transmits the phase difference to be imparted, to the control circuit 103. The control circuit 103 determines the phase shift amounts of the respective phase shifters 102a and 102b further based on the phase difference between the left-hand circularly polarized signal and the right-hand circularly polarized signal.

In the present embodiment, the coupling circuit 105 outputs a part of the received signal to the control circuit 103, and outputs the remaining signal to the connection point 110. The coupling circuit 105 is, for example, a directional coupler. Further, as a modification, the coupling circuit 105 may be a switch. In a case where the coupling circuit 105 is a switch, the received signal is output to the connection point 110 or the control circuit 103. The switching of the output destination by the switch is performed under the control of the control circuit 103.

Figure 8:
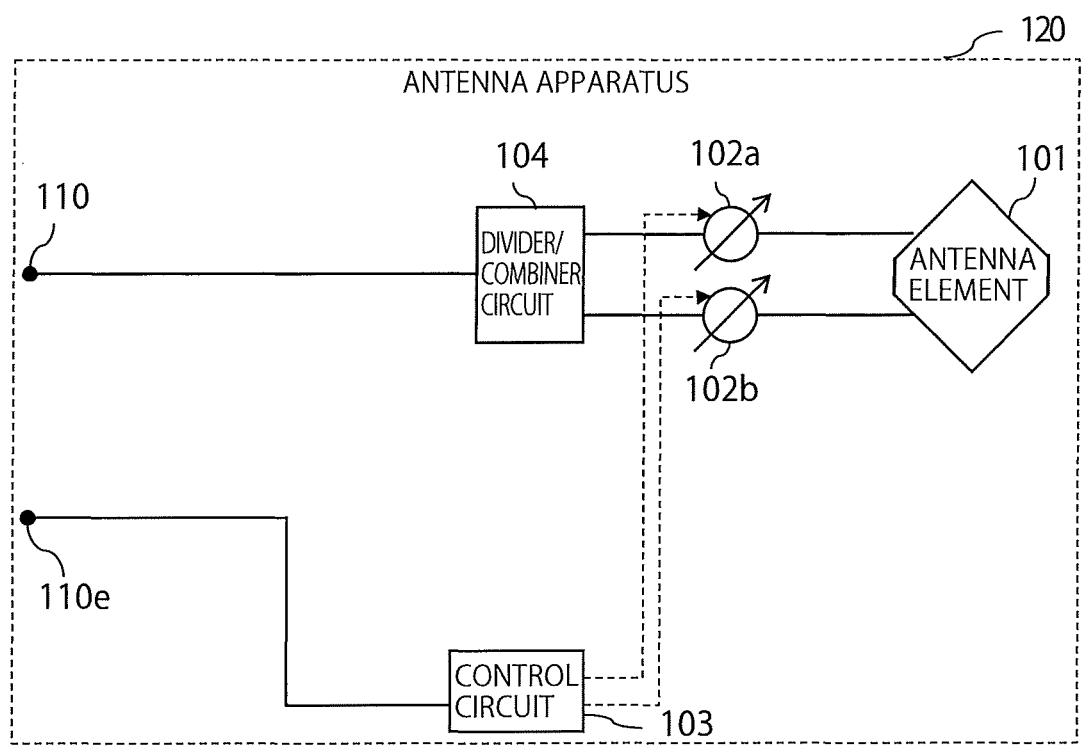
FIG. 8 is a configuration diagram of an antenna apparatus 120 applicable to the first embodiment.

Further, the antenna apparatus 100 may not include the coupling circuit 105. FIG. 8 illustrates an antenna apparatus 120 that is configured by eliminating the coupling circuit 105 from the antenna apparatus 100. A connection point 110e illustrated in FIG. 8 is similar to the connection point 110. Operation by the antenna apparatus 120 is similar to the operation by the antenna apparatus 100 described in the present embodiment. Therefore, description other than differences is omitted.

As the differences, the control circuit 103 acquires the power of the received signal through a part of the received signal input from the coupling circuit 105 in the present embodiment, whereas the received signal is input from the connection point 110 to a device connected to the antenna apparatus 120, and the device performs signal processing of the received signal in this modification. Information representing the power of the received signal is output from the device to the antenna apparatus 120. The information is input to the control circuit 103 through the connection point 110e.

The device connected to the antenna apparatus 120 may output a part of the received signal transmitted from the connection point 110, to the control circuit 103 through the connection point 110e.

Eliminating the coupling circuit 105 makes it possible to downsize the antenna apparatus and to save the power, and to provide the power of the received signal to the device connected to the antenna apparatus 120 without reducing the power of the received signal.

In the present embodiment, any transmission lines are applicable to the lines connecting the components of the antenna apparatus 100 as long as a high-frequency signal can propagate. Examples of the lines include microstrip lines, coplanar lines, striplines, parallel two-wire lines, coaxial lines, and waveguides. Although a plurality of types of lines may be combined, two lines connecting the antenna apparatus 100 to the phase shifters 102a and 120b are the same type of lines, and two lines connecting the phase shifters 102a and 102b to the divider/combiner circuit 104 are also the same type of lines.

The modifications of the configuration and the operation of the antenna apparatus 100 have been described above. Antenna apparatus applicable to the present embodiment are described below with reference to FIG. 9 to FIG. 13. In FIG. 9 to FIG. 13, components similar to the components of the antenna apparatus 100 are denoted by the same reference numerals, and description of the components is omitted.

Figure 9:
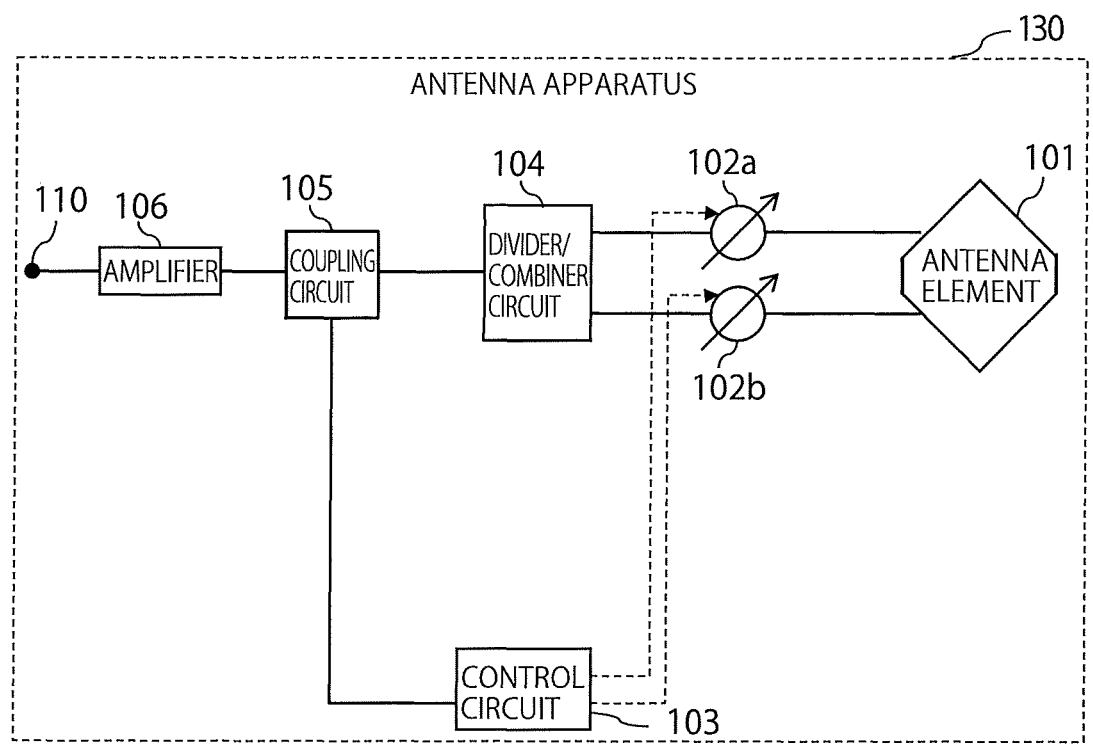
FIG. 9 is a configuration diagram of an antenna apparatus 130 applicable to the first embodiment.

The antenna apparatus 100 may further include an amplifier 106. FIG. 9 is a configuration diagram of an antenna apparatus 130 further including the amplifier 106.

The amplifier 106 amplifies the power of the input signal, and outputs the resultant-signal. In FIG. 9, the amplifier 106 is provided between the connection point 110 and the coupling circuit 105. The amplifier 106 amplifies the power of each of the transmission signal and the received signal. Any device is applicable as the amplifier 106 as long as the device can amplify the power of the input signal and output the resultant signal. Examples of the amplifier 106, include a power amplifier (PA) and a low-noise amplifier (LNA).

When the amplifier 106 is provided, the power of the linearly polarized wave to be radiated from the antenna element 101 can be increased in transmission. In a case where the antenna apparatus 130 is used for wireless communication, it is possible to improve signal-to-noise ratio (S/N ratio). In a case where the antenna apparatus 130 is used for wireless power transmission, it is possible to increase a power feeding amount. Increase of the power supply amount leads to reduction of a power feeding time for a power feeding target. Further, in reception, the amplifier 106 can amplify the power of the received signal. Therefore, in the case where the antenna apparatus 130 is used for wireless communication, it is possible to improve the S/N ratio.

Note that operation by the antenna apparatus 130 in signal transmission and in signal reception is similar to the operation described in the present embodiment. Therefore, description of the operation is omitted. As a modification of the operation, the control circuit 103 may instruct the operation of the amplifier 106.

Figure 10:
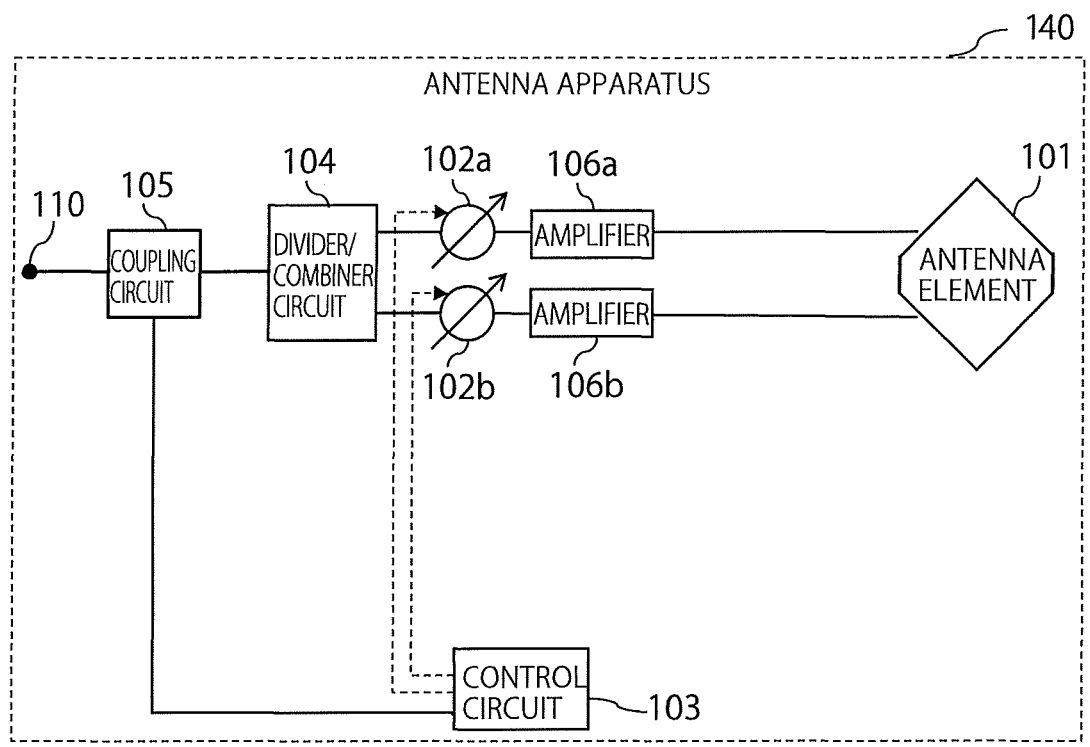
FIG. 10 is a configuration diagram of an antenna apparatus 140 applicable to the first embodiment.

FIG. 10 is a configuration diagram of an antenna apparatus 140 further including amplifiers 106a and 106b. The amplifiers 106a and 106b are each similar to the amplifier 106 described above. Unlike the antenna apparatus 130, in the antenna apparatus 140, one amplifier 106a is provided between the antenna element 101 and the phase shifter 102a and one amplifier 106b is provided between the antenna element 101 and the phase shifter 102b. In the antenna apparatus 140, the amplifier 106a amplifies the left-hand circularly polarized signal, and the amplifier 106b amplifies the right-hand circularly polarized signal.

As with the case illustrated in FIG. 9, when the amplifiers 106a and 106b are provided, the power of the linearly polarized wave to be transmitted from the antenna element 101 can be increased in transmission. In a case where the antenna apparatus 140 is used for wireless communication, it is possible to improve an S/N ratio. In a case where the antenna apparatus 140 is used for wireless power transmission, it is possible to increase a power feeding amount. Further, in reception, the amplifiers 106a and 106b can amplify the power of the received signal. Therefore, in the case where the antenna apparatus 140 is used for wireless communication, it is possible to improve the S/N ratio.

Note that operation by the antenna apparatus 140 in signal transmission and in signal reception is similar to the operation described in the present embodiment. Therefore, description of the operation is omitted. As a modification of the operation, the control circuit 103 may instruct the operation of the amplifiers 106a and 106b.

Figure 11:
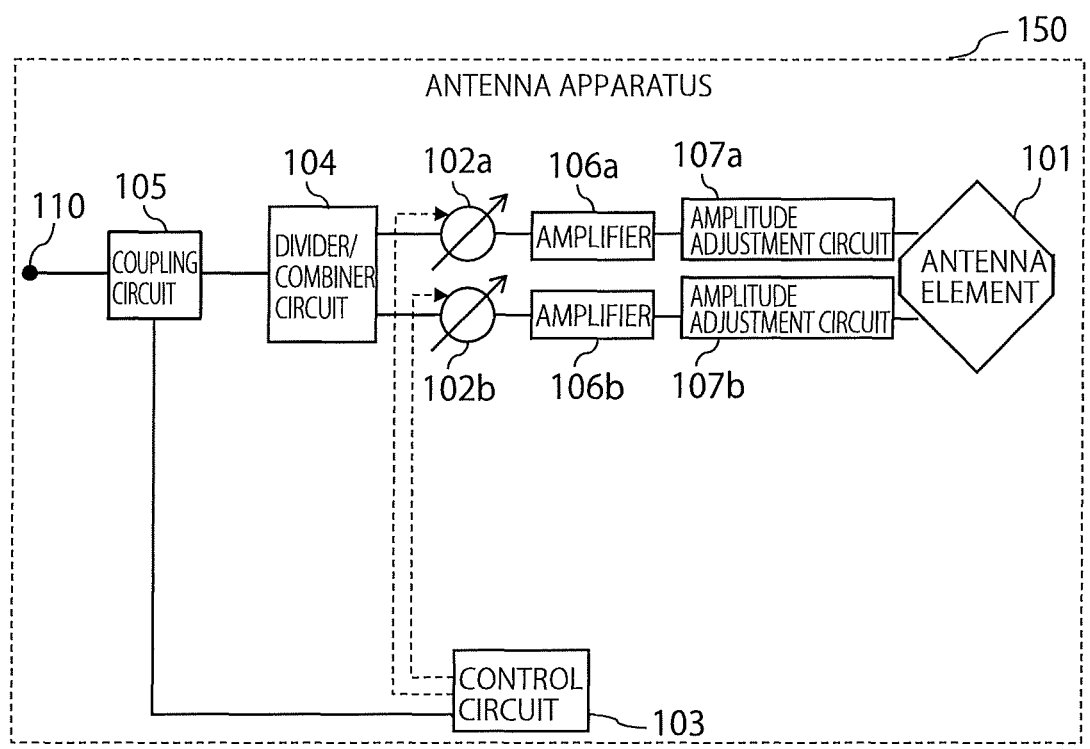
FIG. 11 is a configuration diagram of an antenna apparatus 150 applicable to the first embodiment.

The antenna apparatus 140 may further include amplitude adjustment circuits 107a and 107b. FIG. 11 is a configuration diagram of an antenna apparatus 150 further including the amplitude adjustment circuits 107a and 107b.

Each of the amplitude adjustment circuits 107a and 107b can change an amplitude of the input signal. In signal transmission, in a case where the left-hand circularly polarized signal and the right-hand circularly polarized signal respectively output from the amplifiers 106a and 106b are different in amplitude, the amplitude adjustment circuits 107a and 107b change the amplitude of the left-hand circularly polarized signal and the amplitude of the right-hand circularly polarized signal to the equivalent amplitude. When the amplitude of the left-hand circularly polarized signal and the amplitude of the right-hand circularly polarized signal are equivalent to each other, it is possible to maintain the excellent XPD.

Note that operation by the antenna apparatus 150 in signal transmission and in signal reception is similar to the operation described in the present embodiment. Therefore, description of the operation is omitted. As a modification of the operation, the control circuit 103 may instruct the operation of the amplitude adjustment circuits 107a and 107b. At this time, the left-hand circularly polarized signal and the right-hand circularly polarized signal respectively output from the amplifiers 106a and 106b may be partially output to the control circuit 103. The control circuit 103 may measure the amplitude of the input left-hand circularly polarized signal and the amplitude of the input right-hand circularly polarized signal, and instruct the operation of the amplitude adjustment circuits 107a and 107b. The output of a part of the signals from the amplifiers 106a and 106b to the control circuit 103 may be performed using coupling circuits 105a and 105b each similar to the coupling circuit 105 described in the present embodiment.

Figure 12:
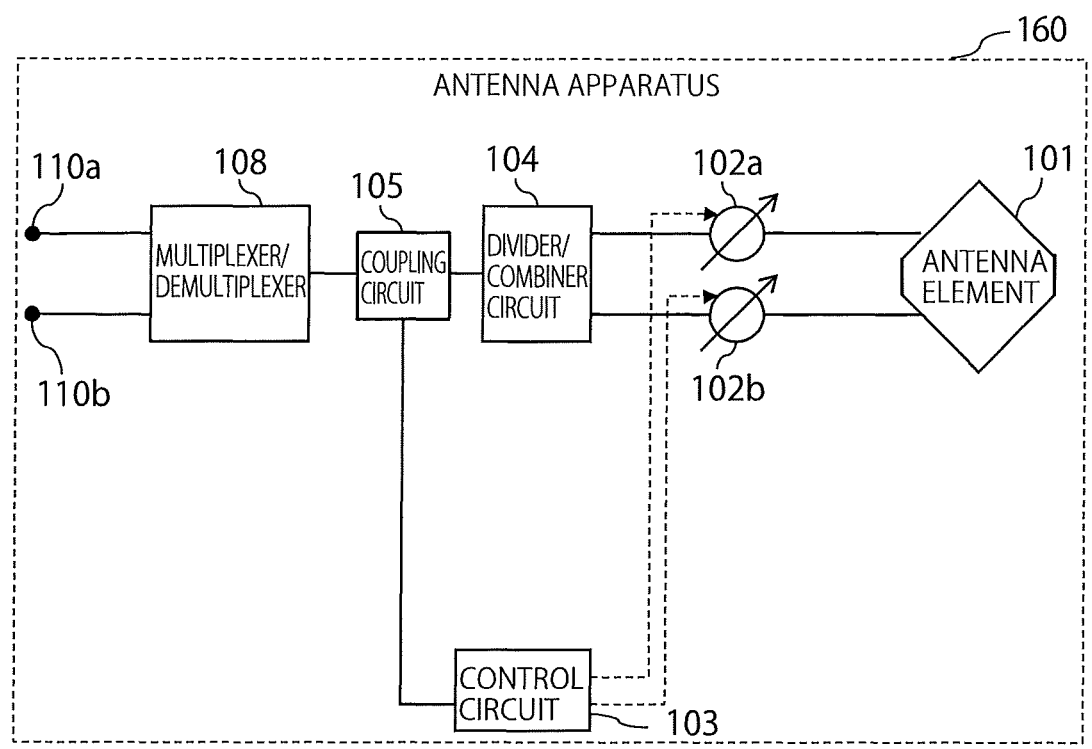
FIG. 12 is a configuration diagram of an antenna apparatus 160 applicable to the first embodiment.

The antenna apparatus 100 may further include a multiplexer/demultiplexer 108. FIG. 12 is a configuration diagram of an antenna apparatus 160 further including the multiplexer/demultiplexer 108.

The multiplexer/demultiplexer 108 separates the transmission signal and the received signal to different lines. In FIG. 12, the multiplexer/demultiplexer 108 is connected to the coupling circuit 105 and connection points 110a and 110b. The connection points 110a and 110b are each similar to the connection point 110 described in the present embodiment. In FIG. 12, the transmission signal is output from the connection point 110a to the coupling circuit 105 through the multiplexer/demultiplexer 108. The received signal is output from the coupling circuit 105 to the connection point 110b through the multiplexer/demultiplexer 108. Any device is applicable as the multiplexer/demultiplexer 108 as long as the device can separate the transmission signal and the received signal to different lines. Examples of the multiplexer/demultiplexer 108 include a circulator that can perform separation by a structure, a diplexer that can perform separation by a frequency, and a switch that can perform separation by a time.

The transmission signal and the received signal can be separated to different lines by the multiplexer/demultiplexer 108. Separating the transmission signal and the received signal makes it possible to reduce possibility of crosstalk of the transmission signal and the received signal, and to maintain the excellent XPD.

Note that operation by the antenna apparatus 160 in signal transmission and in signal reception is similar to the operation described in the present embodiment. Therefore, description of the operation is omitted.

Figure 13:
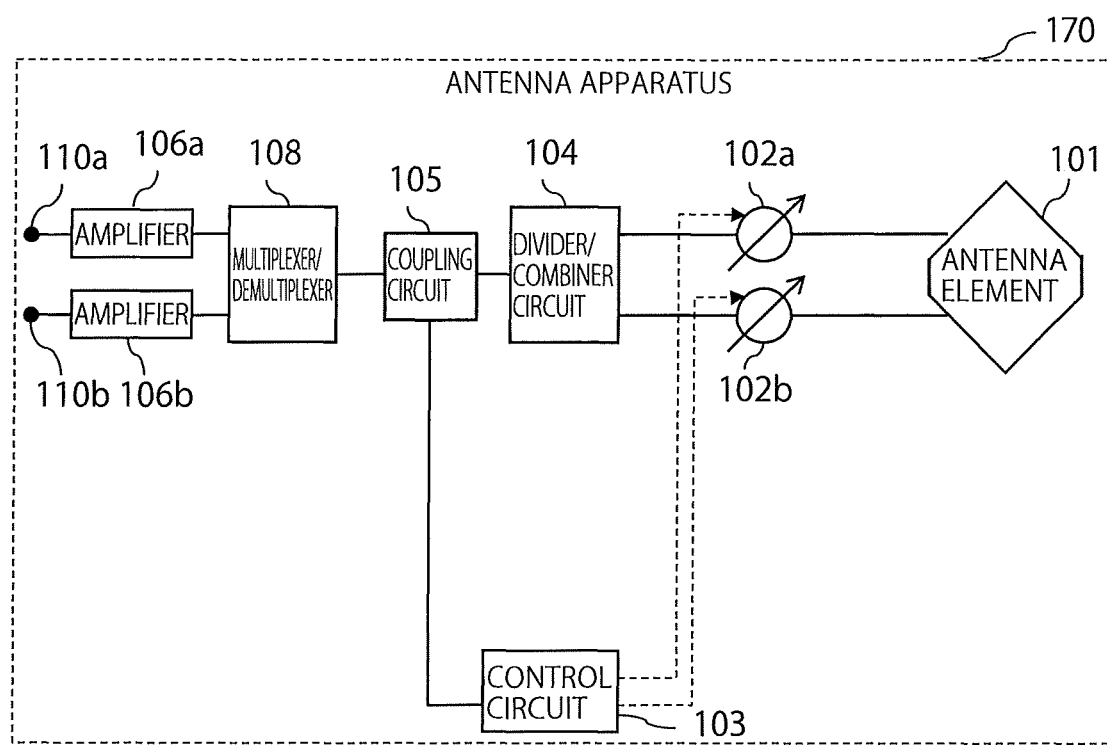
FIG. 13 is a configuration diagram of an antenna apparatus 170 applicable to the first embodiment.

The antenna apparatus 160 may further include the amplifiers 106a and 106b. FIG. 13 is a configuration diagram of an antenna apparatus 170 further including the amplifiers 106a and 106b. In the antenna apparatus 170, the amplifier 106a amplifies the transmission signal, and the amplifier 106b amplifies the received signal.

As with the antenna apparatus illustrated in FIG. 9 to FIG. 11, when the amplifiers 106a and 106b are provided, it is possible to increase the power of the linearly polarized wave to be radiated from the antenna element 101 in transmission. In a case where the antenna apparatus 170 is used for wireless communication, it is possible to improve an S/N ratio. In a case where the antenna apparatus 170 is used for wireless power transmission, it is possible to increase a power feeding amount. Further, in reception, the power of the received signal can be amplified. Therefore, in the case where the antenna apparatus 170 is used for wireless communication, it is possible to improve the S/N ratio.

Note that operation by the antenna apparatus 170 in signal transmission and in signal reception is similar to the operation described in the present embodiment. Therefore, description of the operation is omitted. As a modification of the operation, the control circuit 103 may instruct the operation of the amplifiers 106a and 106b.

The antenna apparatus 100 according to the first embodiment and the modifications thereof have been described above. The antenna apparatus according to the present embodiment shifts the phase of the left-hand circularly polarized signal and the phase of the right-hand circularly polarized signal based on the insertion losses of the phase shifters 102a and 102b. This makes it possible to control the phase shift amounts of the phase shifters, and to change the angle of the polarization plane. Further, the phase of the left-hand circularly polarized signal and the phase of the right-hand circularly polarized signal are shifted so as to make the insertion losses equivalent to each other, which makes it possible to change the polarization angle while maintaining the excellent XPD.

Second Embodiment

Figure 14:
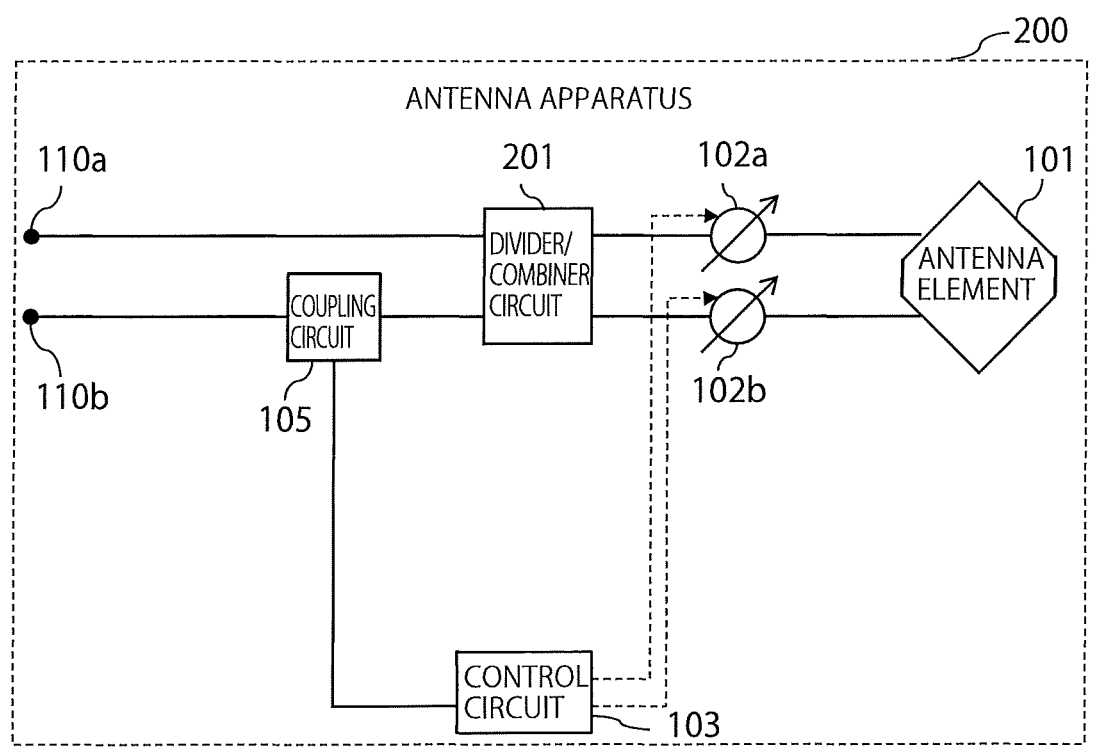
FIG. 14 is a configuration diagram of an antenna apparatus 200 according to a second embodiment.

FIG. 14 is a diagram illustrating a configuration of an antenna apparatus 200 according to a second embodiment. The antenna apparatus 200 includes a divider/combiner circuit 201 that is different from the divider/combiner circuit of the antenna apparatus 100 according to the first embodiment. The configuration of the antenna apparatus 200 is similar to the configuration of the antenna apparatus 100 except for the divider/combiner circuit 201. Therefore, the same components are denoted by the same reference numerals, and description of the components is omitted. When the divider/combiner circuit 201 is provided, the antenna apparatus 200 can transmit and receive two linearly polarized waves of different polarization angles without changing the phase shift amounts of the phase shifters 102a and 102b. The antenna apparatus 200 can further handle the two linearly polarized waves of the different polarization angles. Therefore, in addition to the effects described in the first embodiment, the antenna apparatus 200 can efficiently transmit and receive signals.

The divider/combiner circuit 201 includes four terminals. The divider/combiner circuit 201 is connected to the phase shifters 102a and 102b, the coupling circuit 105, and the connection point 110a.

As with the divider/combiner circuit 104, the divider/combiner circuit 201 divides a signal into two signals, and combines two signals to one signal. More specifically, in signal transmission, the divider/combiner circuit 201 divides the transmission signal into the left-hand circularly polarized signal and the right-hand circularly polarized signal, and outputs the signals. The amplitude of the divided left-hand circularly polarized signal and the amplitude of the divided right-hand circularly polarized signal are equivalent to each other. In signal reception, the divider/combiner circuit 201 combines the input left-hand circularly polarized signal and the input right-hand circularly polarized signal, and outputs the received signal.

In signal transmission, the divider/combiner circuit 201 divides the transmission signal input from one of the connection points 110a and 110b into the left-hand circularly polarized signal and the right-hand circularly polarized signal. The divider/combiner circuit 201 outputs the left-hand circularly polarized signal to the phase shifter 102a, and outputs the right-hand circularly polarized signal to the phase shifter 102b. The left-hand circularly polarized signal and the right-hand circularly polarized signal are not output to the other connection point.

The divider/combiner circuit 201 can divide the signal while imparting the phase difference. When the divider/combiner circuit 201 divides the signal while imparting the phase difference, the transmission signal from the connection point 110a and the transmission signal from the connection point 110b are eventually transmitted from the antenna element 101, as linearly polarized waves different in polarization angle.

The divider/combiner circuit 201 combines the left-hand circularly polarized signal and the right-hand circularly polarized signal respectively input from the phase shifters 102a and 102b to the received signal. The divider/combiner circuit 201 outputs the received signal to one of the connection points 110a and 110b, and does not output the received signal to the other connection point. As used herein, the term "not output" indicates "hardly output", and is not limited to "not output at all".

In signal reception, the power of the received signal output from the divider/combiner circuit 201 to each of the connection point 110a and the coupling circuit 105 is varied depending on the phase difference between the input left-hand circularly polarized signal and the input right-hand circularly polarized signal.

The power of the received signal output from the divider/combiner circuit 201 to each of the connection point 110a and the coupling circuit 105 depends on the phase difference between the left-hand circularly polarized signal and the right-hand circularly polarized signal that are combination sources of the received signal. For example, when the left-hand circularly polarized signal and the right-hand circularly polarized signal input to the divider/combiner circuit 201 are close to in-phase, the power of the received signal output to the connection point 110a is increased, whereas the power of the received signal output to the coupling circuit 105 is reduced. In contrast, when the left-hand circularly polarized signal and the right-hand circularly polarized signal input to the divider/combiner circuit 201 are close to reversed phases, the power of the received signal output to the connection point 110a is reduced, whereas the power of the received signal output to the coupling circuit 105 is increased.

When the left-hand circularly polarized signal and the right-hand circularly polarized signal input to the divider/combiner circuit 201 are in-phase, the divider/combiner circuit 201 outputs the received signal to the connection point 110a but does not output the received signal to the coupling circuit 105. In contrast, when the left-hand circularly polarized signal and the right-hand circularly polarized signal input to the divider/combiner circuit 201 are reversed phases, the divider/combiner circuit 201 outputs the received signal to the coupling circuit 105 but does not output the received signal to the connection point 110a.

Any circuit is applicable as the divider/combiner circuit 201 as long as the circuit includes four terminals, and divides a signal into two signals and combines two signals to one signal. Examples of the circuit include a hybrid circuit such as a magic Tee hybrid circuit, a rat-race hybrid circuit, a quadrature hybrid coupler, and a 180° hybrid coupler. In the present embodiment, as an example, a case where a quadrature hybrid coupler is applied is described.

The divider/combiner circuit 201 that is a component of the antenna apparatus 200 has been described above. A mounting method similar to the mounting method for the antenna apparatus 100 is applicable to the antenna apparatus 200.

Operation of the antenna apparatus 200 is described below. Note that the operation by the antenna apparatus 200 is similar to the operation by the antenna apparatus 100. Therefore, outline of the operation is described. First, outline of the operation by the antenna apparatus 200 in transmission is described.

In the present embodiment, the transmission signal can be input from the connection points 110a and 110b to the divider/combiner circuit 201. By the division by the divider/combiner circuit 201, the linearly polarized wave based on the transmission signal input from the connection point 110a and the linearly polarized wave based on the transmission signal input from the connection point 110b become the linearly polarized waves, the polarization planes of which are orthogonal to each other.

The linearly polarized waves, the polarization planes of which are orthogonal to each other, can suppress interference applied by the linearly polarized waves to each other, and signal transmission and signal reception of each of the linearly polarized waves can be performed.

In the description of signal transmission according to the present embodiment, the transmission signal input from the connection point 110a is referred to as a first transmission signal, and the transmission signal input from the connection point 110b is referred to as a second transmission signal. The left-hand circularly polarized signal and the right-hand circularly polarized signal divided from the first transmission signal are respectively referred to as a first left-hand circularly polarized signal and a first right-hand circularly polarized signal. The left-hand circularly polarized signal and the right-hand circularly polarized signal divided from the second transmission signal are respectively referred to as a second left-hand circularly polarized signal and a second right-hand circularly polarized signal. A frequency band of the first transmission signal and a frequency band of the second transmission signal are equivalent to each other. Further, a frequency band of the first left-hand circularly polarized signal and a frequency band of the second left-hand circularly polarized signal are also equivalent to each other, and a frequency band of the first right-hand circularly polarized signal and a frequency band of the second right-hand circularly polarized signal are equivalent to each other.

Further, in the present embodiment, the divider/combiner circuit 201 divides the signal while imparting the phase difference. In the present embodiment, as an example, the phase of the divided first right-hand circularly polarized signal is delayed by 90° from the phase of the divided first left-hand circularly polarized signal. The amplitude of the divided first left-hand circularly polarized signal and the amplitude of the divided first right-hand circularly polarized signal are similar to each other. The phase of the divided second left-hand circularly polarized signal is delayed by 90° from the phase of the divided second right-hand circularly polarized signal. The amplitude of the divided second left-hand circularly polarized signal and the amplitude of the divided second right-hand circularly polarized signal are similar to each other.

In a case where the first transmission signal is input to the divider/combiner circuit 201, the operation is similar to the operation described in the first embodiment. As described in the first embodiment, the polarization angle of the linearly polarized wave based on the first transmission signal is "$\tau_1$". In the present embodiment, the phase of the divided first right-hand circularly polarized signal is delayed by 90° from the phase of the divided first left-hand circularly polarized signal. The control circuit 103 determines the phase shift amounts "$\phi_1$" and "$\phi_2$" that satisfy a formula (15) and make the insertion losses of the phase shifters 102a and 102b equivalent to each other.

[Formula 15]

$$\phi_1 - \phi_2 = 2\tau_1 + 90° \tag{15}$$

The succeeding operation is similar to the operation described in the first embodiment. The control circuit 103 transmits the phase shift amounts "$\phi_1$" and "$\phi_2$" to the phase shifters 102a and 102b, and the phase shifters 102a and 102b respectively set the phase shift amounts to "$\phi_1$" and "$\phi_2$". In a case where the first transmission signal is input from the connection point 110a, the divider/combiner circuit 201 divides the first transmission signal into the first left-hand circularly polarized signal and the first right-hand circularly polarized signal. The divider/combiner circuit 201 outputs the first left-hand circularly polarized signal to the phase shifter 102a, and outputs the first right-hand circularly polarized signal to the phase shifter 102b. The phase of the first left-hand circularly polarized signal is shifted by the phase shift amount "$\phi_1$" by the phase shifter 102a, and the resultant signal is output to the antenna element 101. The phase of the first right-hand circularly polarized signal is shifted by the phase shift amount "$\phi_2$" by the phase shifter 102b, and the resultant signal is output to the antenna element 101. The antenna element 101 outputs the first left-hand circularly polarized signal and the first right-hand circularly polarized signal to transmit the linearly polarized wave of the polarization angle "$\tau_1$".

The case where the first transmission signal is input to the divider/combiner circuit 201 has been described above. The operation in a case where the second transmission signal is input to the divider/combiner circuit 201 is similar to the operation in the case where the first transmission signal is input to the divider/combiner circuit 201 described above. Therefore, description of the operation is omitted. The phase shift amounts of the phase shifters 102a and 102b are respectively set to "$\phi_1$" and "$\phi_2$" in a similar manner. The second transmission signal is eventually transmitted as the linearly polarized wave of the polarization angle "$\tau_2$" from the antenna element 101.

The case where the first transmission signal is input to the divider/combiner circuit 201 and the case where the second transmission signal is input to the divider/combiner circuit 201 have been separately described; however, the operation in both cases can be simultaneously performed. In this case, the linearly polarized wave of the polarization angle "$\tau_1$" and the linearly polarized wave of the polarization angle "$\tau_2$" are simultaneously radiated from the antenna element 101.

Figure 15:
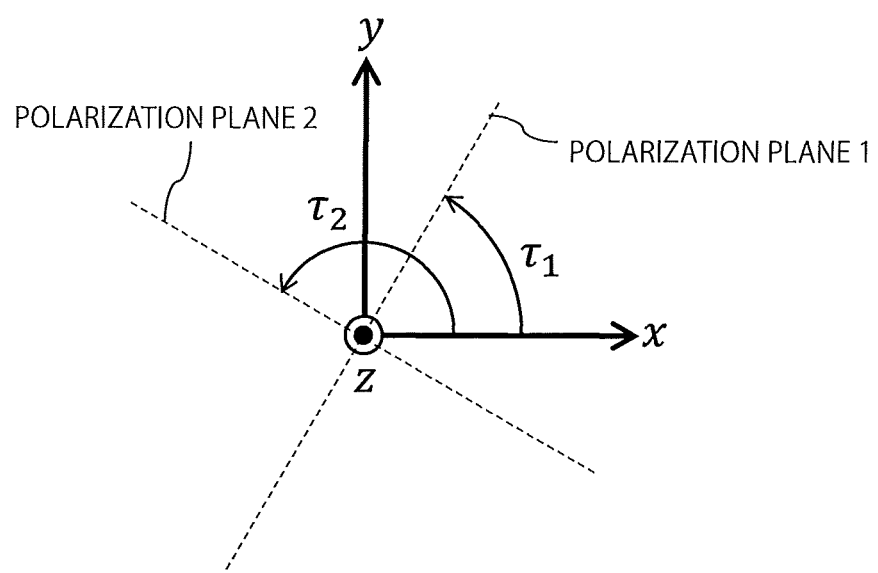
FIG. 15 is a diagram illustrating polarization angles "$\tau_1$" and "$\tau_2$" according to the second embodiment.

FIG. 15 is a diagram illustrating the polarization plane of the linearly polarized wave based on the first transmission signal and the polarization plane of the linearly polarized wave based on the second transmission signal. FIG. 15 illustrates that the polarization plane of the linearly polarized wave based on the first transmission signal has the polarization angle "$\tau_1$", and the polarization plane of the linearly polarized wave based on the second transmission signal has the polarization angle "$\tau_2$". Description that the polarization plane of the linearly polarized wave based on the first transmission signal and the polarization plane of the linearly polarized wave based on the second transmission signal are orthogonal to each other is given below.

In the present embodiment, the phase of the divided first right-hand circularly polarized signal is delayed by 90° from the phase of the divided first left-hand circularly polarized signal, and the phase of the divided second left-hand circularly polarized signal is delayed by 90° from the phase of the divided second right-hand circularly polarized signal. As a result, a phase difference "$\Delta\psi_2$" between the second left-hand circularly polarized signal and the second right-hand circularly polarized signal is represented by a formula (16):

[Formula 16]

$$\Delta\psi_2 = 2\tau_1 + 180° \tag{16}$$

The formula (5) and the formula (16) can be modified to a formula (17):

[Formula 17]

$$\tau_2 = \frac{\Delta\psi_2}{2} = \tau_1 + 90° \tag{17}$$

In the formula (17), the difference between the polarization angle "$\tau_1$" and the polarization angle "$\tau_1$" is 90°. Accordingly, the polarization plane (polarization plane 1) of the linearly polarized wave based on the first transmission signal and the polarization plane (polarization plane 2) of the linearly polarized wave based on the second transmission signal are orthogonal to each other.

The case where the first transmission signal is input to the divider/combiner circuit 201 and the case where the second transmission signal is input to the divider/combiner circuit 201 have been described above. The operation by the antenna apparatus 200 in reception is described below.

As an example, reception of the linearly polarized wave of the polarization angle "$\tau_1$" and reception of the linearly polarized wave of the polarization angle "$\tau_2$" by the antenna apparatus 200 are described. Note that, as with the first embodiment, the phase shift amounts of the phase shifters 102a and 102b are set in advance.

In the description of signal reception according to the present embodiment, signals output from the antenna element 101 to the phase shifters 102a and 102b after the antenna element 101 receives the linearly polarized wave of the polarization angle "$\tau_1$" are referred to as the first left-hand circularly polarized signal and the first right-hand circularly polarized signal. Signals output from the antenna element 101 to the phase shifters 102a and 102b after the antenna element 101 receives the linearly polarized wave of the polarization angle "$\tau_2$" are referred to as the second left-hand circularly polarized signal and the second right-hand circularly polarized signal. A signal combined from the first left-hand circularly polarized signal and the first right-hand circularly polarized signal by the divider/combiner circuit 201 is referred to as a first received signal. A signal combined from the second left-hand circularly polarized signal and the second right-hand circularly polarized signal by the divider/combiner circuit 201 is referred to as a second received signal.

A frequency band of the first left-hand circularly polarized signal and a frequency band of the second left-hand circularly polarized signal are equivalent to each other, and a frequency band of the first right-hand circularly polarized signal and a frequency band of the second right-hand circularly polarized signal are equivalent to each other. Further, a frequency band of the first received signal and a frequency band of the second received signal are equivalent to each other.

A case where the antenna element 101 receives the linearly polarized wave of the polarization angle "$\tau_1$" is described. Most of the operation by the antenna apparatus 200 is similar to the operation by the antenna apparatus 100 according to the first embodiment. A difference is that the control circuit 103 determines the phase shift amounts of the phase shifters 102a and 102b so as to reduce the power of the input received signal. In the present embodiment, the control circuit 103 sets a second power threshold that is different from the power threshold described in the first embodiment. The second power threshold is used to determine whether the divider/combiner circuit 201 does not output the first received signal to the coupling circuit 105.

The operation other than the difference is similar to the operation described in the first embodiment. The antenna element 101 receives the linearly polarized wave of the polarization angle "$\tau_1$", and outputs the first left-hand, circularly polarized signal and the first right-hand circularly polarized signal respectively to the phase shifters 102a and 102b. The phase shifters 102a and 102b respectively shift the phase of the first left-hand circularly polarized signal and the phase of the first right-hand circularly polarized signal by the preset phase shift amounts, and output the resultant signals to the divider/combiner circuit 201. The divider/combiner circuit 201 combines the first received signal from the first left-hand circularly polarized signal and the first right-hand circularly polarized signal. The divider/combiner circuit 201 outputs the first received signal to the connection point 110a and the coupling circuit 105 based on the phase of each of the first left-hand circularly polarized signal and the first right-hand circularly polarized signal as combination sources.

Among the plurality of sets of phase shift amounts of the phase shifters 102a and 102b having the phase differences corresponding to various polarization angles, the control circuit 103 determines a set at which the power of the input first received signal is reduced, and changes the preset phase shift amounts to the phase shift amounts of the determined set. The set of phase shift amounts of the phase shifters 102a and 102b makes the insertion losses of the phase shifters 102a and 102b equivalent to each other.

The control circuit 103 transmits the sets of phase shift amounts of the phase shifters 102a and 102b corresponding to various polarization angles, to the phase shifters 102a and 102b, and measures the reception power, thereby determining the set of phase shift amounts satisfying the second power threshold.

In the present embodiment, the determined phase shift amounts are "$\phi_1$" and "$\phi_2$". In the case where the phase shift amounts are "$\phi_1$" and "$\phi_2$", the first received signal is not output to the coupling circuit 105, and is output to the connection point 110a. The succeeding operation is similar to the operation in the first embodiment. Therefore, description of the operation is omitted.

The case where the antenna element 101 receives the linearly polarized wave of the polarization angle "$\tau_1$" has been described above. Operation in a case where the antenna element 101 receives the linearly polarized wave of the polarization angle "$\tau_2$" is similar to the operation in the first embodiment. Therefore, description of the operation is omitted.

In the case where the phase shift amounts set to the phase shifters 102a and 102b are "$\phi_1$" and "$\phi_2$", the first received signal is output to the coupling circuit 105, and is not output to the connection point 110a.

The case where the antenna apparatus 200 receives the linearly polarized wave of the polarization angle "$\tau_1$" and the case where the antenna apparatus 200 receives the linearly polarized wave of the polarization angle "$\tau_2$" have been separately described; however, the operation in both cases can be simultaneously performed. In the case where the phase shift amounts of the phase shifters 102a and 102b are set to "$\phi_1$" and "$\phi_2$" and the antenna apparatus 200 receives the linearly polarized wave of the polarization angle "$\tau_1$" and the linearly polarized wave of the polarization angle "$\tau_2$", the divider/combiner circuit 201 outputs the first received signal to the connection point 110a, and outputs the second received signal to the coupling circuit 105.

The operation by the antenna apparatus 200 according to the second embodiment has been described above. Also as for the second embodiment, various modifications can be mounted and implemented. The modifications according to the first embodiment are applicable to the antenna apparatus 200.

In the present embodiment, the coupling circuit 105 is connected to the divider/combiner circuit 201 and the connection point 110b. As a modification, the coupling circuit 105 may be connected to the divider/combiner circuit 201 and the connection point 110a.

As modifications, antenna apparatus applicable to the present embodiment are described below with reference to FIG. 16 to FIG. 22. In FIG. 16 to FIG. 22, components similar to the components of the antenna apparatus 200 are denoted by the same reference numerals, and description of the components is omitted.

Figure 16:
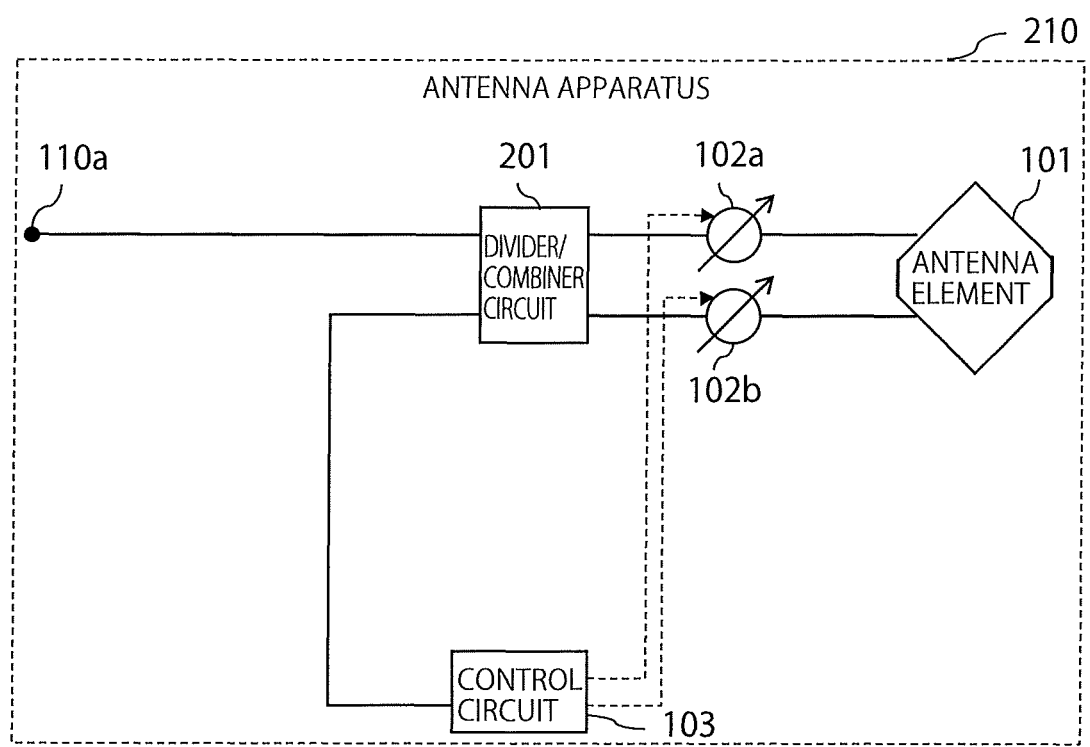
FIG. 16 is a configuration diagram of an antenna apparatus 210 applicable to the second embodiment.

FIG. 16 is a configuration diagram of an antenna apparatus 210 not including the coupling circuit 105. In the antenna apparatus 210, one terminal of the divider/combiner circuit 201 is connected to the control circuit 103. In this case, as described in the present embodiment, two polarization angles "$\tau_1$" and "$\tau_2$" cannot be handled with the same phase shift amounts.

Most of operation by the antenna apparatus 210 is similar to the operation by the antenna apparatus 100 according to the first embodiment. A difference is that the control circuit 103 determines the phase shift amounts of the phase shifters 102a and 102b so as to reduce the power of the input received signal. Eliminating the coupling circuit 105 makes it possible to further downsize the antenna apparatus.

Figure 17:
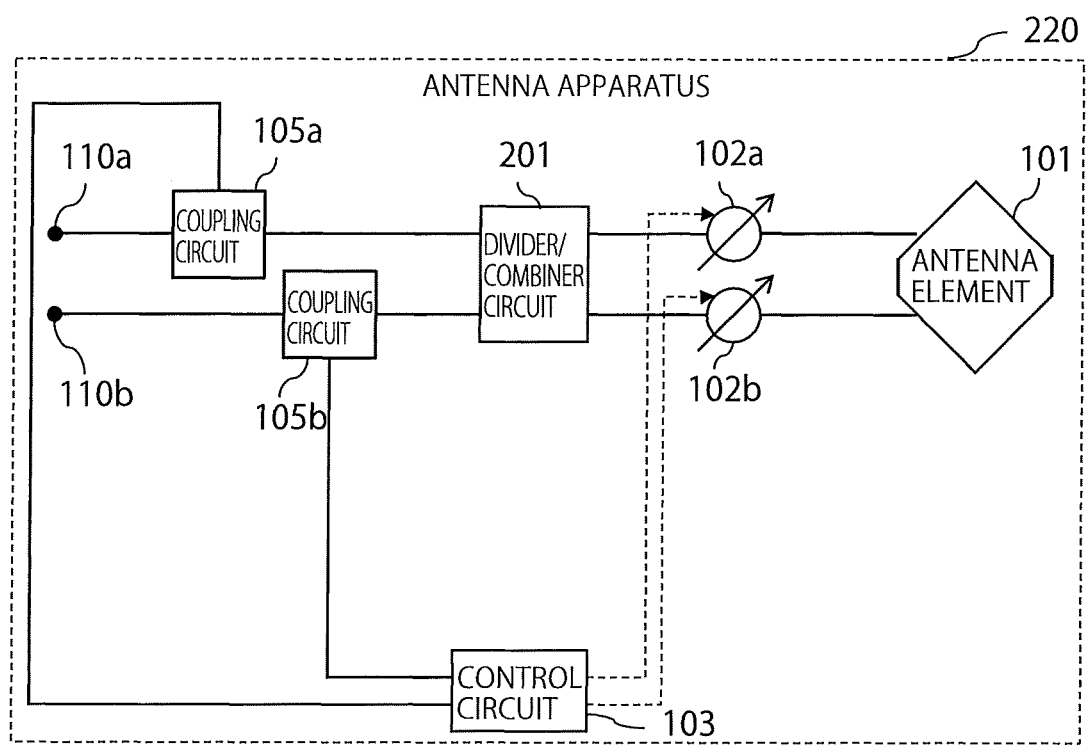
FIG. 17 is a configuration diagram of an antenna apparatus 220 applicable to the second embodiment.

The antenna apparatus 200 may further include the coupling circuit 105. FIG. 17 is a configuration diagram of an antenna apparatus 220 including coupling circuits 105a and 105b. Each of the coupling circuits 105a and 105b is similar to the coupling circuit 105. Operation by the antenna apparatus 220 is similar to the operation by the antenna apparatus 200 according to the present embodiment. Therefore, description of the operation is omitted. The control circuit 103 may determine the phase shift amounts of the phase shifters 102a and 102b also based on power of the received signal output from the coupling circuit 105a.

Figure 18:
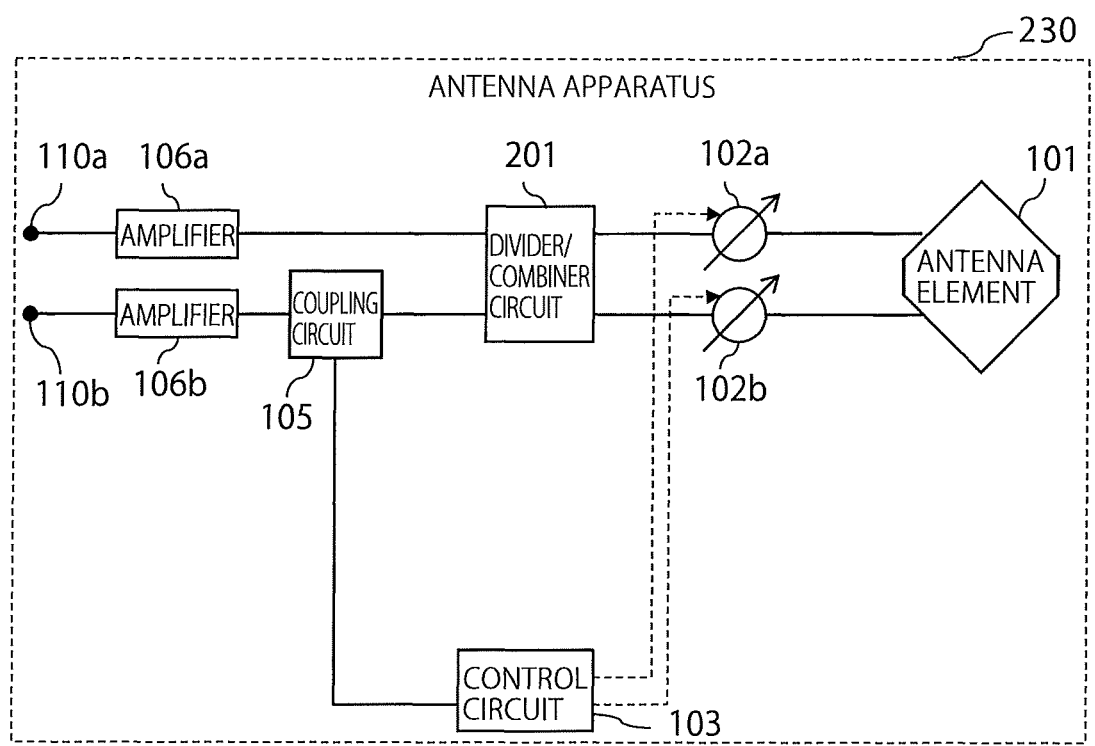
FIG. 18 is a configuration diagram of an antenna apparatus 230 applicable to the second embodiment.

The antenna apparatus 200 may further include the amplifiers 106a and 106b. FIG. 18 is a configuration diagram of an antenna apparatus 230 further including the amplifiers 106a and 106b. The amplifier 106a is connected to the divider/combiner circuit 201 and the connection point 110a, and the amplifier 106b is connected to the coupling circuit 105 and the connection point 110b.

Operation by the antenna apparatus 230 is similar to the operation by the antenna apparatus 200 according to the present embodiment. Therefore, description of the operation is omitted. The amplifier 106a amplifies the first transmission signal and the first received signal, and the amplifier 106b amplifies the second transmission signal and the second received signal. In a case where the antenna apparatus 230 is used for wireless communication, it is possible to improve an S/N ratio. In a case where the antenna apparatus 230 is used for wireless power transmission, it is possible to increase a power feeding amount, and to reduce a power feeding time for a power feeding target.

Figure 19:
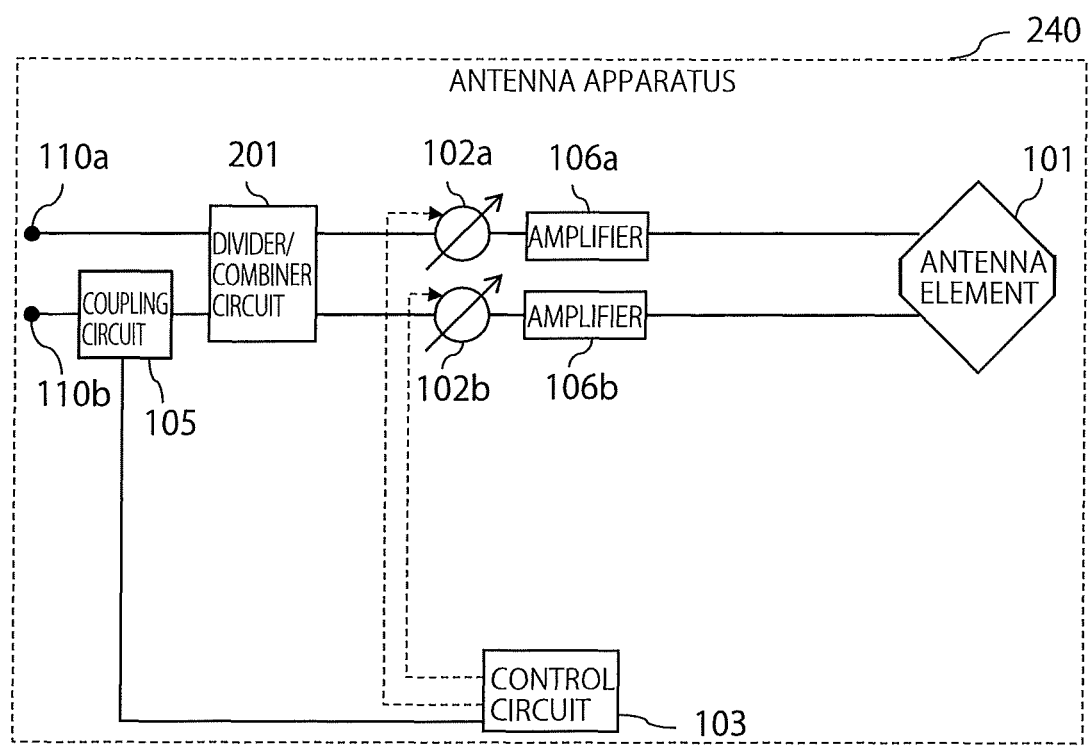
FIG. 19 is a configuration diagram of an antenna apparatus 240 applicable to the second embodiment.

FIG. 19 is a configuration diagram of an antenna apparatus 240 further including the amplifiers 106a and 106b. Unlike the antenna apparatus 230 illustrated in FIG. 18, the amplifier 106a is connected to the antenna element 101 and the phase shifter 102a, and the amplifier 106b is connected to the antenna element 101 and the phase shifter 102b.

Operation by the antenna apparatus 240 is similar to the operation by the antenna apparatus 200 according to the present embodiment. Therefore, description of the operation is omitted. The amplifier 106a amplifies the first left-hand circularly polarized signal and the second left-hand circularly polarized signal in both of transmission and reception. The amplifier 106b amplifies the first right-hand circularly polarized signal and the second right-hand circularly polarized signal in both of transmission and reception. As with the antenna apparatus 230, in a case where the antenna apparatus 240 is used for wireless communication, it is possible to improve an S/N ratio. In a case where the antenna apparatus 240 is used for wireless power transmission, it is possible to increase a power feeding amount, and to reduce a power feeding time for a power feeding target.

Figure 20:
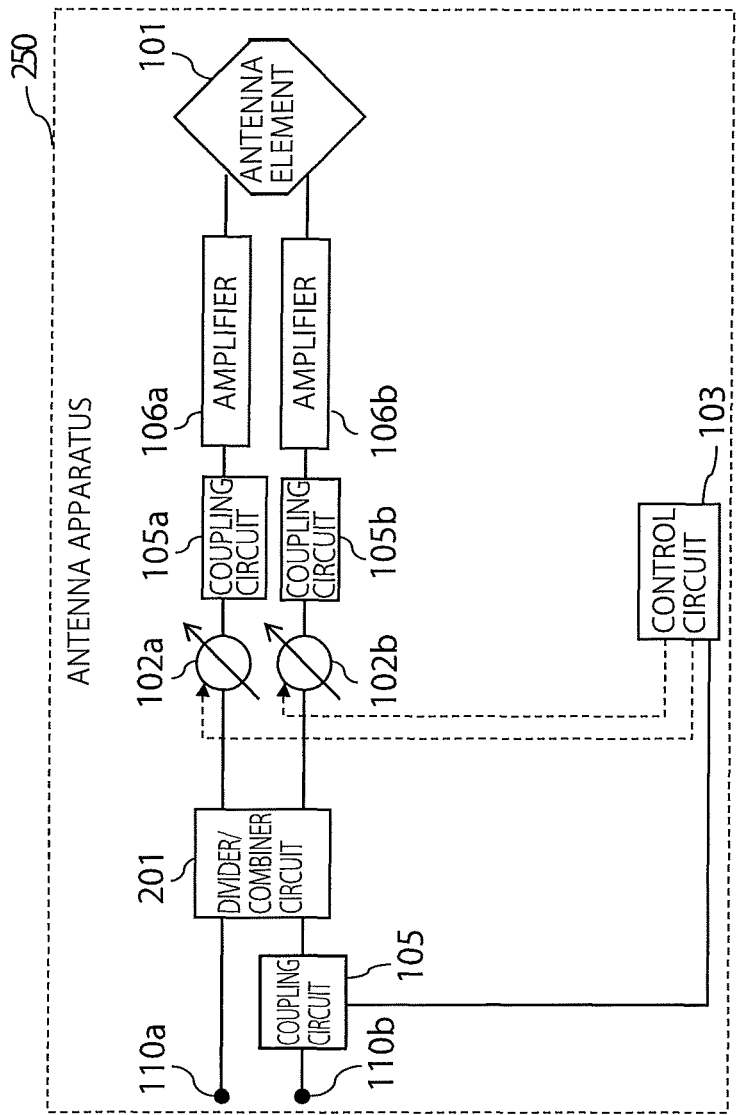
FIG. 20 is a configuration diagram of an antenna apparatus 250 applicable to the second embodiment.

The antenna apparatus 240 may further include the amplitude adjustment circuits 107a and 107b. FIG. 20 is a configuration diagram of an antenna apparatus 250 further including the amplitude adjustment circuits 107a and 107b. Operation by the antenna apparatus 250 is similar to the operation by the antenna apparatus 200 according to the present embodiment. Therefore, description of the operation is omitted. The amplitude adjustment circuit 107a can change the amplitude of the first left-hand circularly polarized signal and the amplitude of the second left-hand circularly polarized signal in both of transmission and reception. The amplitude adjustment circuit 107b can change the amplitude of the first right-hand circularly polarized signal and the amplitude of the second right-hand circularly polarized signal in both of transmission and reception. When the amplitude of the first left-hand circularly polarized signal and the amplitude of the first right-hand circularly polarized signal are made equivalent to each other and the amplitude of the second left-hand circularly polarized signal and the amplitude of the second right-hand circularly polarized signal are made equivalent to each other, it is possible to maintain the excellent XPD.

Figure 21:
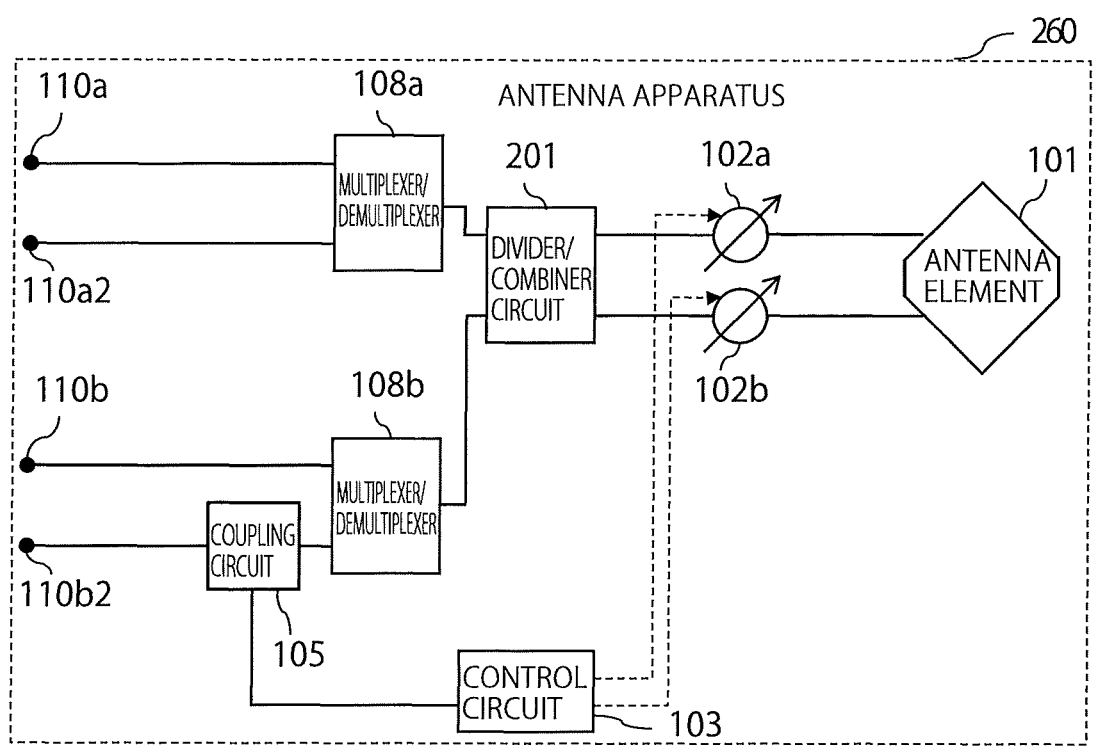
FIG. 21 is a configuration diagram of an antenna apparatus 260 applicable to the second embodiment.

The antenna apparatus 200 may further include multiplexers/demultiplexers 108a and 108b. FIG. 21 is a configuration diagram of an antenna apparatus 260 further including the multiplexers/demultiplexers 108a and 108b. Operation by the antenna apparatus 260 is similar to the operation by the antenna apparatus 200 according to the present embodiment. Therefore, description of the operation is omitted.

Each of the multiplexers/demultiplexers 108a and 108b is similar to the multiplexer/demultiplexer 108 described in the first embodiment. The multiplexer/demultiplexer 108a is connected to the divider/combiner circuit 201, the connection point 110a, and a connection point 110a2. The multiplexer/demultiplexer 108b is connected to the divider/combiner circuit 201, the connection point 110b, and a connection point 110b2. Each of the connection points 110a2 and 110b2 is similar to the connection point 110 described in the first embodiment.

Operation by the antenna apparatus 260 is similar to the operation by the antenna apparatus 200 according to the present embodiment. Therefore, description of the operation is omitted. The multiplexer/demultiplexer 108a can separate the first transmission signal and the first and second received signals to different lines, and the multiplexer/demultiplexer 108b can separate the second transmission signal and the first and second received signals to different lines.

For example, the first transmission signal is output from the connection point 110a to the divider/combiner circuit 201 through the multiplexer/demultiplexer 108a. The first received signal and the second received signal are output from the divider/combiner circuit 201 to the connection point 110a2 through the multiplexer/demultiplexer 108a. The second transmission signal is output from the connection point 110b to the divider/combiner circuit 201 through the multiplexer/demultiplexer 108b. The first received signal and the second received signal are output from the divider/combiner circuit 201 to the connection point 110b2 through the multiplexer/demultiplexer 108b.

As described in the present embodiment, in the case where the phase shift amounts of the phase shifters 102a and 102b are "$\phi_1$" and "$\phi_2$", the first received signal is output from the divider/combiner circuit 201 to the connection point 110a2 through the multiplexer/demultiplexer 108a. The second received signal is output from the divider/combiner circuit 201 to the connection point 110b2 through the multiplexer/demultiplexer 108b.

Figure 22:
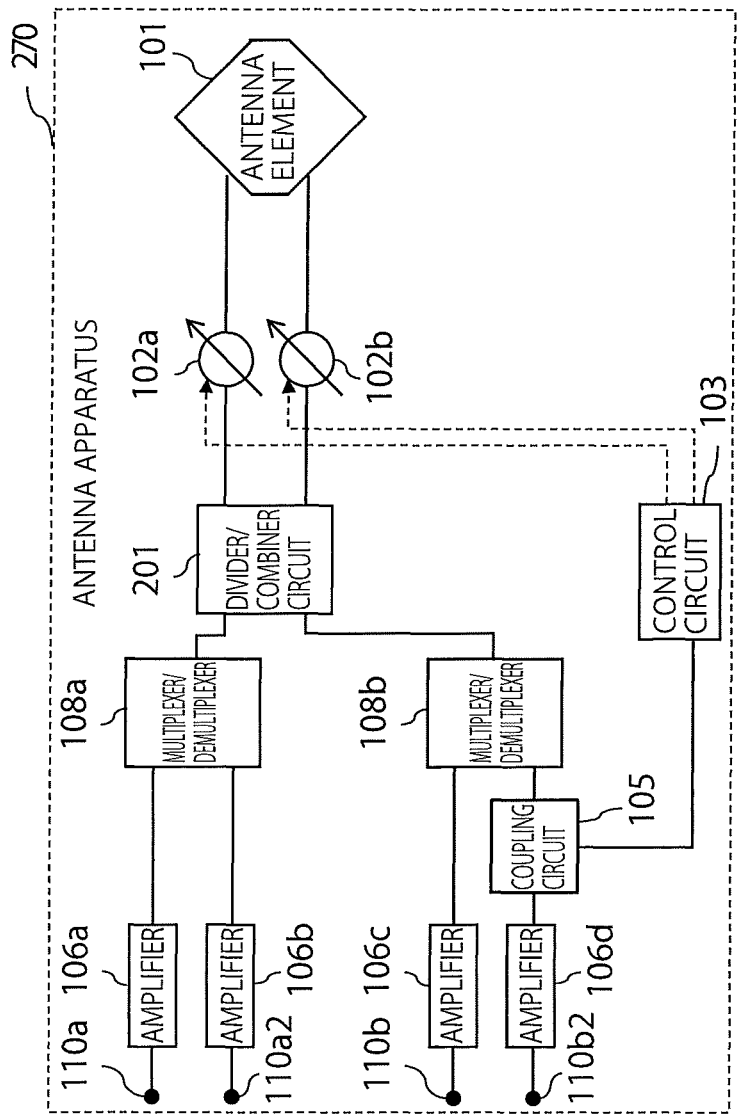
FIG. 22 is a configuration diagram of an antenna apparatus 270 applicable to the second embodiment.

The antenna apparatus 260 may further include amplifiers 106a to 106d. FIG. 22 is a configuration diagram of an antenna apparatus 270 that is configured by adding the amplifiers 106a to 106d to the antenna apparatus 260. Operation by the antenna apparatus 270 is similar to the operation by the antenna apparatus 200 according to the present embodiment. Therefore, description of the operation is omitted. Each of the amplifiers 106a to 106d amplifies the passing transmission signal and the passing received signal.

As with the antenna apparatus illustrated in FIG. 18 to FIG. 20, in a case where the antenna apparatus 270 is used for wireless communication, it is possible to improve an S/N ratio. In a case where the antenna apparatus 270 is used for wireless power transmission, it is possible to increase a power feeding amount, and to reduce a power feeding time for a power feeding target. The antenna apparatus 200 according to the second embodiment and the modifications thereof have been described above. Since the antenna apparatus according to the present embodiment includes the divider/combiner circuit 201 including the four terminals, the antenna apparatus can transmit and receive two linearly polarized waves, the polarization planes of which are orthogonal to each other, without changing the phase shift amounts of the phase shifters 102a and 102b. Since the antenna apparatus according to the present invention can handle the two linearly polarized waves with different polarization angles, it is possible to maintain the excellent XPD while controlling the polarization angles, and to efficiently transmit and receive signals.

Third Embodiment

Figure 23:
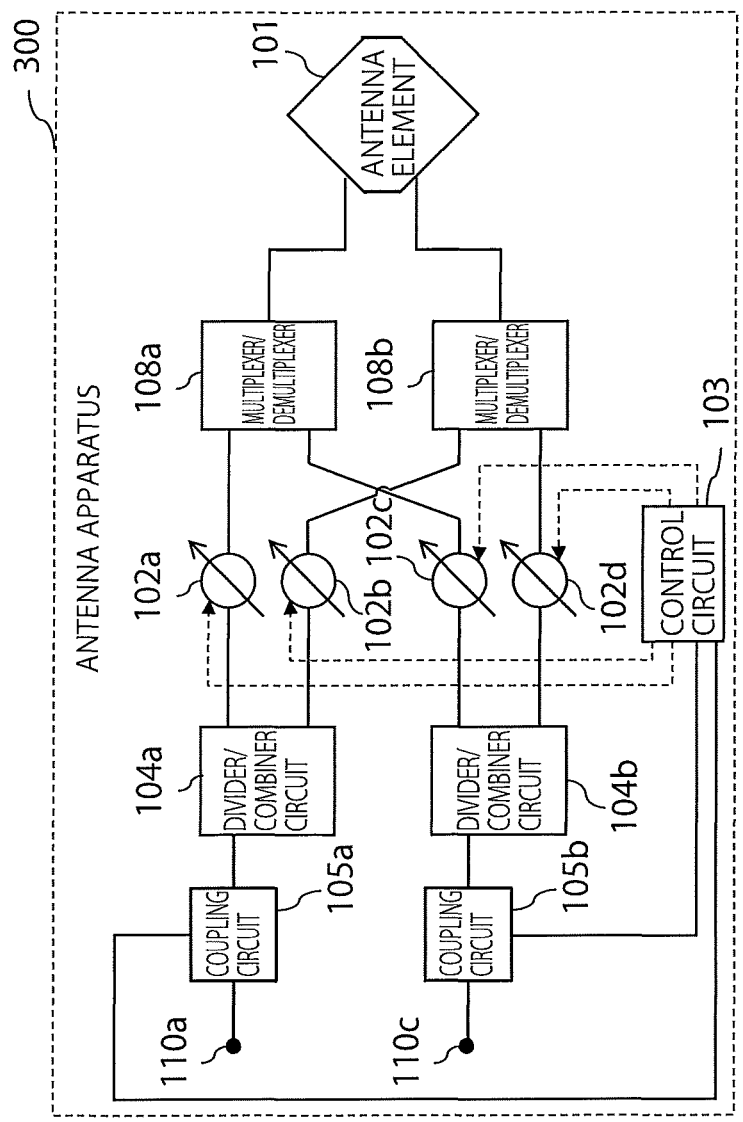
FIG. 23 is a configuration diagram of an antenna apparatus 300 according to a third embodiment.

FIG. 23 is a diagram illustrating a configuration of an antenna apparatus 300 according to a third embodiment. The antenna apparatus 300 includes two divider/combiner circuits 104 (104a and 104b), two coupling circuits 105 (105a and 105b), two multiplexers/demultiplexers 108 (108a and 108b), and four phase shifters 102 (102a to 102d). Components similar to the components of the antenna apparatus 100 according to the first embodiment are denoted by the same reference numerals, and description of the components is omitted.

The control circuit 103 sets the phase shift amounts of the phase shifters 102a and 102b that have the phase difference corresponding to the polarization angle and make the insertion losses of the phase shifters equivalent to each other. The control circuit 103 sets the phase shift amounts of the phase shifters 102c and 102d that have the phase difference corresponding to the polarization angle and make the insertion losses of the phase shifters equivalent to each other. The antenna apparatus 300 can transmit and receive signals of different frequency bands, in addition to the effects described in the first embodiment.

The antenna apparatus 300 can transmit and receive signals of different frequency bands. Since the antenna apparatus 300 can transmit and receive signals of different frequency bands, in addition to the effects described in the first embodiment, it is possible to efficiently transmit and receive signals.

The antenna element 101 is connected to the multiplexers/demultiplexers 108a and 108b. The multiplexer/demultiplexer 108a is connected to the antenna element 101, the phase shifter 102a, and the phase shifter 102c. The multiplexer/demultiplexer 108b is connected to the antenna element 101, the phase shifter 102b, and the phase shifter 102d. The phase shifter 102a is connected to the multiplexer/demultiplexer 108a and the divider/combiner circuit 104a. The phase shifter 102b is connected to the multiplexer/demultiplexer 108b and the divider/combiner circuit 104a. The phase shifter 102c is connected to the multiplexer/demultiplexer 108a and the divider/combiner circuit 104b. The phase shifter 102d is connected to the multiplexer/demultiplexer 108b and the divider/combiner circuit 104b.

A mounting method similar to the mounting method for the antenna apparatus 100 or 200 is applicable to the antenna apparatus 300.

Operation of the antenna apparatus 300 according to the present embodiment is described below. In the present embodiment, as an example, the four phase shifters 102a to 102d are similar phase shifters. When dividing a signal, the divider/combiner circuit 104a and the divider/combiner circuit 104b do not impart the phase difference. Further, each of the multiplexers/demultiplexers 108a and 108b is a diplexer that outputs the signals to different lines depending on the frequency band of the input signal.

Further, in addition to the information representing the relationship of the insertion losses and the phase shift amounts of the phase shifters 102a and 102b, the control circuit 103 holds information representing relationship of the insertion losses and the phase shift amounts of the phase shifters 102c and 102d. In the description according to the present embodiment, the information representing the relationship of the insertion losses and the phase shift amounts of the phase shifters 102a and 102b is referred to as first characteristic information, and the information representing the relationship of the insertion losses and the phase shift amounts of the phase shifters 102c and 102d is referred to as second characteristic information.

The operation by the antenna apparatus 300 in signal transmission is described below. The operation is similar to the operation by the antenna apparatus 100. Therefore, outline of the operation is described. The antenna apparatus 300 can transmit a signal of a first frequency band and a signal of a second frequency band.

In the description of signal transmission according to the present embodiment, the transmission signal input from the connection point 110a is referred to as the first transmission signal, and the transmission signal input from the connection point 110c is referred to as a third transmission signal. Two signals divided from the first transmission signal are referred to as the first left-hand circularly polarized signal and the first right-hand circularly polarized signal, and two signals divided from the third transmission signal are referred to as a third left-hand circularly polarized signal and a third right-hand circularly polarized signal. A frequency band of the first transmission signal and a frequency band of the third transmission signal are different from each other and are respectively the first frequency band and the second frequency band. A frequency band of the first left-hand circularly polarized signal and a frequency band of the third left-hand circularly polarized signal are different from each other, and a frequency band of the first right-hand circularly polarized signal and a frequency band of the third right-hand circularly polarized signal are different from each other.

Figure 24:
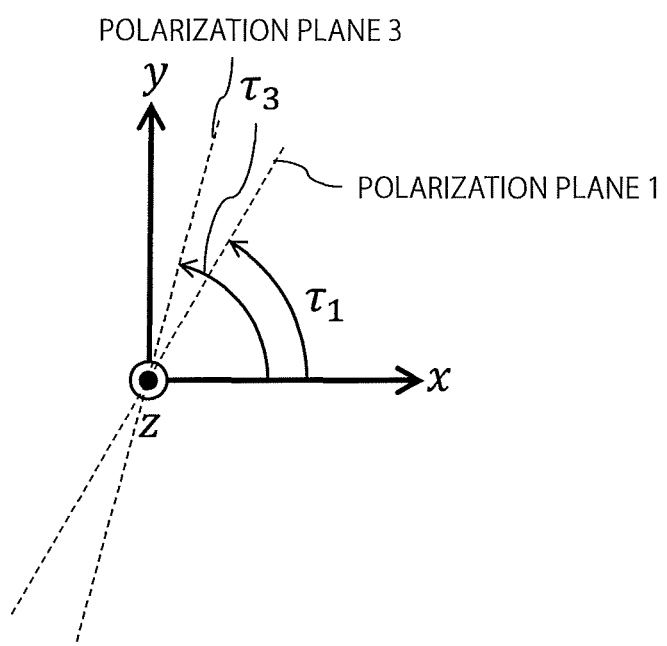
FIG. 24 is a diagram illustrating polarization angles "$\tau_1$" and "$\tau_3$" according to the third embodiment.

In the present embodiment, the control circuit 103 determines the polarization angle of the linearly polarized wave based on the first transmission signal as "$\tau_1$", and determines the polarization angle of the linearly polarized wave based on the third transmission signal as "$\tau_3$". The polarization angles "$\tau_1$" and "$\tau_3$" are freely-selected. FIG. 24 illustrates examples of the polarization angles "$\tau_1$" and "$\tau_3$".

Most of the operation by the antenna apparatus 300 that transmits the first transmission signal as the linearly polarized wave of the polarization angle "$\tau_1$" is similar to the operation in the first embodiment. The control circuit 103 determines the phase shift amounts "$\phi_1$" and "$\phi_2$" that make the insertion losses of the phase shifters 102a and 102b equivalent to each other and have the phase difference corresponding to the polarization angle "$\tau_1$". The phase shifters 102a and 102b respectively set the phase shift amounts "$\phi_1$" and "$\phi_2$".

The first transmission signal is input to the divider/combiner circuit 104a from the connection point 110a through the coupling circuit 105a. The divider/combiner circuit 104a divides the first transmission signal to the first left-hand circularly polarized signal and the first right-hand circularly polarized signal, and outputs the first left-hand circularly polarized signal and the first right-hand circularly polarized signal respectively to the phase shifters 102a and 102b. The phase shifters 102a and 102b respectively shift the phase of the first left-hand circularly polarized signal and the phase of the first right-hand circularly polarized signal, and output the resultant signals to the antenna element 101 through the multiplexers/demultiplexers 108a and 108b. The antenna element 101 radiates the first left-hand circularly polarized signal and the first right-hand circularly polarized signal, as the linearly polarized wave of the polarization angle "$\tau_1$".

The operation by the antenna apparatus 300 that transmits, the third transmission signal as the linearly polarized wave of the polarization angle "$\tau_3$" is similar to the operation by the antenna apparatus 300 that transmits the first transmission signal as the linearly polarized wave of the polarization angle "$\tau_1$" described above. The control circuit 103 determines phase shift amounts "$\phi_3$" and "$\phi_4$" that make the insertion losses of the phase shifters 102c and 102d equivalent to each other and have the phase difference corresponding to the polarization angle "$\tau_3$". The phase shifters 102c and 102d respectively set the phase shift amounts "$\phi_3$" and "$\phi_4$".

Note that the relationship of the polarization angle "$\tau_3$" and the phase shift amounts "$\phi_3$" and "$\phi_4$" is represented by a formula (18):

[Formula 18]

$$\Delta\psi_3 = \phi_3 - \phi_4 = 2\tau_3 \quad (18)$$

The third transmission signal is input to the divider/combiner circuit 104b from the connection point 110c through the coupling circuit 105b. The divider/combiner circuit 104b divides the third transmission signal to the third left-hand circularly polarized signal and the third right-hand circularly polarized signal, and outputs the third left-hand circularly polarized signal and the third right-hand circularly polarized signal respectively to the phase shifters 102c and 102d. The phase shifters 102c and 102d respectively shift the phase of the third left-hand circularly polarized signal and the phase of the third right-hand circularly polarized signal, and output the resultant signals to the antenna element 101 through the multiplexers/demultiplexers 108a and 108b. The antenna element 101 radiates the third left-hand circularly polarized signal and the third right-hand circularly polarized signal, as the linearly polarized wave of the polarization angle "$\tau_3$".

The case where the first transmission signal is input to the divider/combiner circuit 104a and the case where the third transmission signal is input to the divider/combiner circuit 104b have been separately described; however, the operation in both cases can be simultaneously performed. In this case, the linearly polarized wave of the polarization angle "$\tau_1$" and the linearly polarized wave of the polarization angle "$\tau_3$" are simultaneously radiated from the antenna element 101.

The operation by the antenna apparatus 300 in signal transmission has been described above. The operation by the antenna apparatus 300 in signal reception is described below.

The operation is similar to the operation by the antenna apparatus 100. Therefore, outline of the operation is described. The antenna apparatus 300 can receive a signal of the first frequency band and a signal of the second frequency band. In the present embodiment, the polarization angles of the linearly polarized waves received by the antenna element 101 are "$\tau_1$" and "$\tau_3$" illustrated in FIG. 24.

In the description of signal reception according to the present embodiment, signals output from the antenna element 101 to the multiplexers/demultiplexers 108a and 108b after the antenna element 101 receives the linearly polarized wave of the polarization angle "$\tau_1$" are referred to as the first left-hand circularly polarized signal and the first right-hand circularly polarized signal. Signals output from the antenna element 101 to the multiplexers/demultiplexers 108a and 108b after the antenna element 101 receives the linearly polarized wave of the polarization angle "$\tau_3$" are referred to as the third left-hand circularly polarized signal and the third right-hand circularly polarized signal.

The frequency band of the first left-hand circularly polarized signal and the frequency band of the third left-hand circularly polarized signal are different from each other and are respectively the first frequency band and the second frequency band. The frequency band of the first right-hand circularly polarized signal and the frequency band of the third right-hand circularly polarized signal are different from each other and are respectively the first frequency band and the second frequency band. Further, the frequency band of the first received signal and the frequency band of the third received signal are different from each other and are respectively the first frequency band and the second frequency band.

The phase shifters 102a to 102d shift the phase of the left-hand circularly polarized signal and the phase of the right-hand circularly polarized signal by the preset phase shift amounts. When the frequency band of the signal transmitted from the antenna element 101 is the first frequency band, the multiplexer/demultiplexer 108a outputs the signal to the phase shifter 102a. When the frequency band of the signal radiated from the antenna element 101 is the second frequency band, the multiplexer/demultiplexer 108a outputs the signal to the phase shifter 102c. When the frequency band of the signal radiated from the antenna element 101 is the first frequency band, the multiplexer/demultiplexer 108b outputs the signal to the phase shifter 102b. When the frequency band of the signal radiated from the antenna element 101 is the second frequency band, the multiplexer/demultiplexer 108b outputs the signal to the phase shifter 102d.

Most of the operation by the antenna apparatus 300 that receives the linearly polarized wave of the polarization angle "$\tau_1$" is similar to the operation in the first embodiment.

Upon receiving the linearly polarized wave of the polarization angle "$\tau_1$", the antenna element 101 outputs the first left-hand circularly polarized signal and the first right-hand circularly polarized signal respectively to the multiplexers/demultiplexers 108a and 108b. The multiplexers/demultiplexers 108a and 108b respectively output the first left-hand circularly polarized signal and the first right-hand circularly polarized signal to the phase shifters 102a and 102b.

The phase shifters 102a and 102b respectively shift the phase of the first left-hand circularly polarized signal and the phase of the first right-hand circularly polarized signal by the preset phase shift amounts, and output the resultant signals to the divider/combiner circuit 104a. The divider/combiner circuit 104a combines the first received signal from the first left-hand circularly polarized signal and the first right-hand circularly polarized signal. The divider/combiner circuit 104a outputs the first received signal to the coupling circuit 105a. The coupling circuit 105a outputs the first received signal to the control circuit 103 and the connection point 110a.

Among the sets of phase shift amounts of the phase shifters 102a and 102b corresponding to various polarization angles, the control circuit 103 determines a set at which the power of the input first received signal is increased, and changes the preset phase shift amounts to the phase shift amounts of the determined set. The power threshold described in the first embodiment is used for determination of the set. The set of phase shift amounts of the phase shifters 102a and 102b makes the insertion losses of the phase shifters 102a and 102b equivalent to each other.

The operation by the antenna apparatus 300 that receives the linearly polarized wave of the polarization angle "$\tau_3$" is similar to the operation by the antenna apparatus 300 that receives the linearly polarized wave of the polarization angle "$\tau_1$" described above. Note that the frequency band of the third left-hand circularly polarized signal and the third right-hand circularly polarized signal representing the linearly polarized wave of the polarization angle "$\tau_3$" is the second frequency band. Therefore, the multiplexers/demultiplexers 108a and 108b respectively output the third left-hand circularly polarized signal and the third right-hand circularly polarized signal to the phase shifters 102c and 102d.

Thereafter, likewise, among the sets of phase shift amounts of the phase shifters 102c and 102d corresponding to various polarization angles, the control circuit 103 determines a set at which the power of the input third received signal is increased, and changes the preset phase shift amounts to the phase shift amounts of the determined set. In the present embodiment, as an example, in the determined set, the phase shift amount of the phase shifter 102c is "$\phi_3$", and the phase shift amount of the phase shifter 102d is "$\phi_4$". The set of phase shift amounts of the phase shifters 102c and 102d makes the insertion losses of the phase shifters 102c and 102d equivalent to each other.

The case where the antenna element 101 receives the linearly polarized wave of the polarization angle "$\tau_1$" and the case where the antenna element 101 receives the linearly polarized wave of the polarization angle "$\tau_3$" have been separately described; however, the operation in both cases can be simultaneously performed.

The operation by the antenna apparatus 300 has been described above. Also as for the third embodiment, various modifications can be mounted and implemented. The modifications according to the first and second embodiments are applicable to the antenna apparatus 300.

In the present embodiment, the phase shifters 102a to 102d are similar phase shifters. As a modification, the phase shifters 102a to 102d may be different phase shifters.

Figure 25:
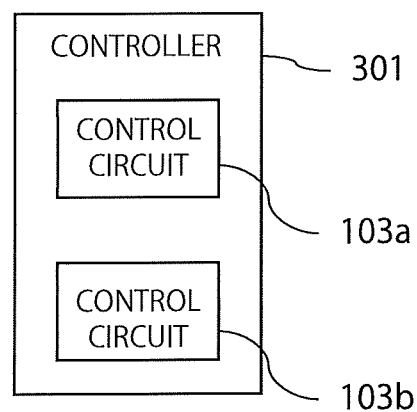
FIG. 25 is a diagram illustrating a control circuit 103.

In the present embodiment, the control circuit 103 determines and transmits the phase shift amounts of the phase shifters 102a to 102d. As a modification, a controller 301 including a plurality of control circuits 103 may be disposed instead. For example, FIG. 25 illustrates the controller 301 including control circuits 103a and 103b. The control circuits 103a and 103b included in the controller 301 may each determine and transmit phase shift amounts of two phase shifters to be paired. For example, the control circuit 103a may determine and transmit the phase shift amounts of the phase shifters 102a and 102b, and the control circuit 103b may determine and transmit the phase shift amounts of the phase shifters 102c and 102d.

In the present embodiment, the control circuit 103 determines the phase shift amounts of the phase shifters 102a and 102b corresponding to the polarization angle of the received linearly polarized wave with use of the power threshold described in the first embodiment. The power threshold is not limited to the value same as the power threshold described in the first embodiment. As a modification, the power threshold used for determination of the phase shift amounts of the phase shifters 102a and 102b and the power threshold used for determination of the phase shift amounts of the phase shifters 102c and 102d may be different from each other.

As modifications, antenna apparatus applicable to the present embodiment are described below with reference to FIG. 26 to FIG. 29. In FIG. 26 to FIG. 29, components similar to the components of the antenna apparatus 300 are denoted by the same reference numerals, and description of the components is omitted.

Figure 26:
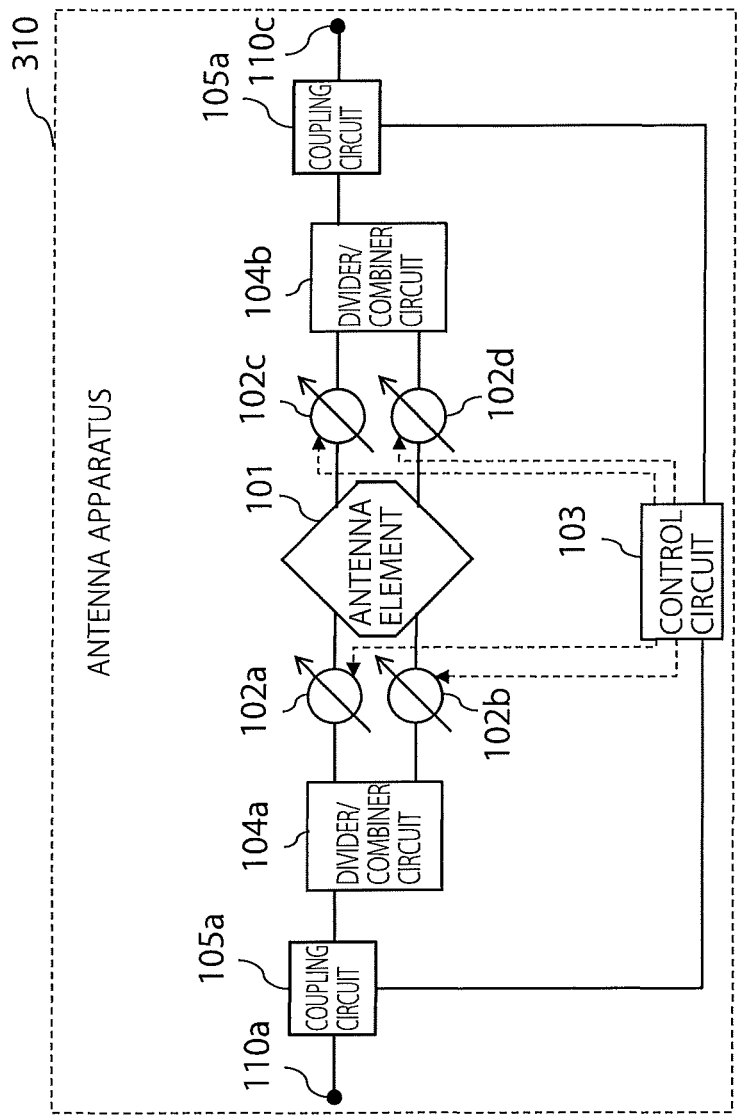
FIG. 26 is a configuration diagram of an antenna apparatus 310 applicable to the third embodiment.

The antenna apparatus 300 may not include the multiplexers/demultiplexers 108a and 108b. FIG. 26 illustrates an antenna apparatus 310 that is configured by eliminating the multiplexers/demultiplexers 108a and 108b from the antenna apparatus 300. The antenna element 101 can change an output destination depending on the frequency band of the received linearly polarized wave. For example, when the frequency band of the received linearly polarized wave is the first frequency band, the antenna element 101 outputs signals to the phase shifters 102a and 102b. when the frequency band of the received linearly polarized wave is the second frequency band, the antenna element 101 outputs signals to the phase shifters 102c and 102d.

Eliminating the multiplexers/demultiplexers 108a and 108b from the antenna apparatus 300 makes it possible to further downsize the antenna apparatus.

Figure 27:
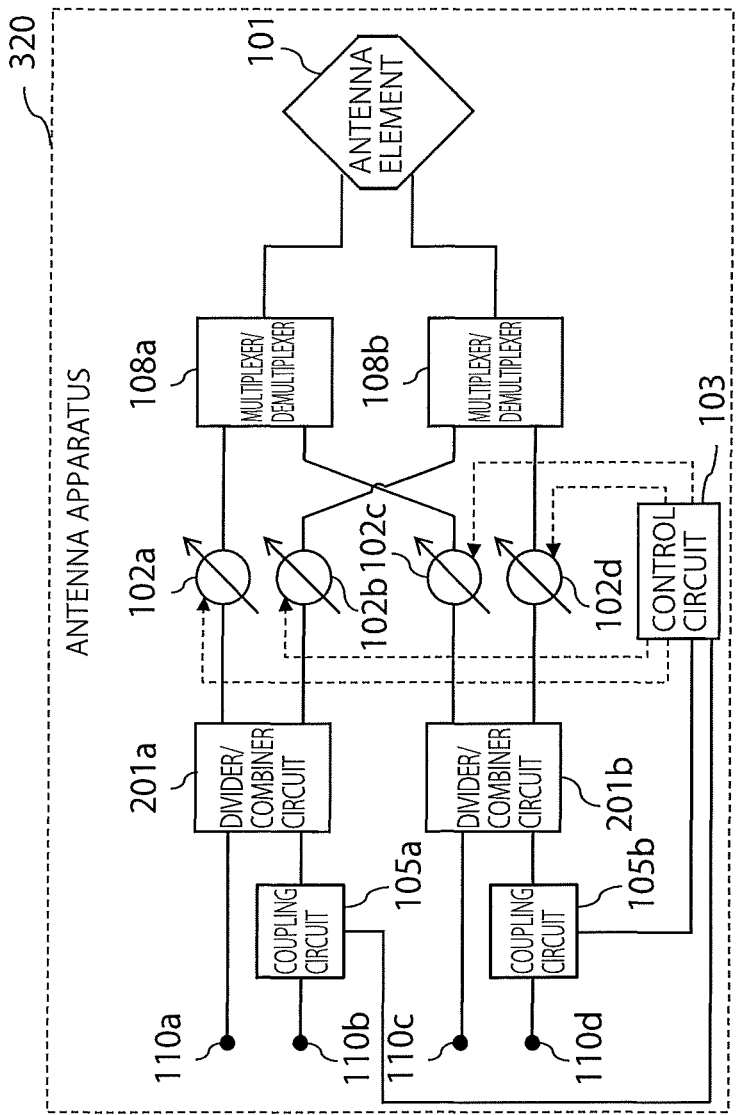
FIG. 27 is a configuration diagram of an antenna apparatus 320 applicable to the third embodiment.

FIG. 27 is a configuration diagram of an antenna apparatus 320 that is configured by replacing the divider/combiner circuits 104a and 104b of the antenna apparatus 300 with divider/combiner circuits 201a and 201b. In other words, the antenna apparatus 320 is an antenna apparatus configured by combining the antenna apparatus 200 according to the second embodiment and the antenna apparatus 300 according to the third embodiment.

The antenna apparatus 320 can transmit and receive signals while handling two polarization angles, the polarization plane of which are orthogonal to each other, in two different frequency bands. The antenna apparatus 320 can transmit and receive signals while handling four polarization angles.

Figure 28:
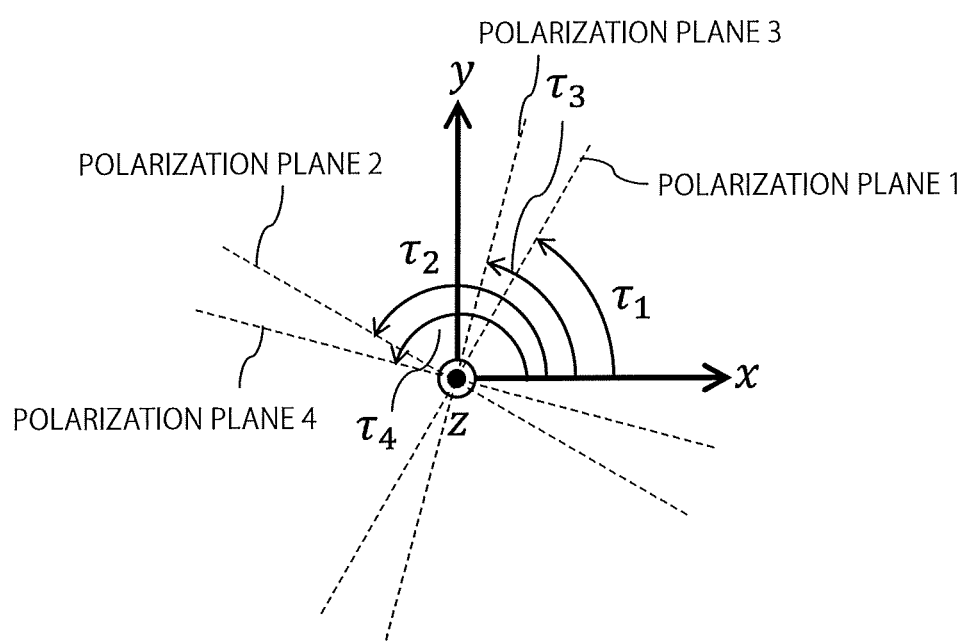
FIG. 28 is a diagram illustrating polarization angles "$\tau_1$" to "$\tau_4$" according to a modification of the third embodiment.

FIG. 28 illustrates examples of four polarization angles "$\tau_1$" to "$\tau_4$". The polarization plane 1 of the polarization angle "$\tau_1$" and the polarization plane 2 of the polarization angle "$\tau_2$" are orthogonal to each other, and the polarization plane 3 of the polarization angle "$\tau_3$" and the polarization plane 4 of the polarization angle "$\tau_4$" are orthogonal to each other.

The antenna apparatus 320 is an antenna apparatus configured by combining the antenna apparatus 200 according to the second embodiment and the antenna apparatus 300 according to the third embodiment. Therefore, outline of operation by the antenna apparatus 320 is described. First, operation by the antenna apparatus 320 in signal transmission is described.

As with the description in the second embodiment, the divider/combiner circuit 201a divides the transmission signal while imparting the phase difference. The control circuit 103 determines the phase shift amounts "$\phi_1$" and "$\phi_2$" at which the first transmission signal input from the connection point 110a is output as the linearly polarized wave of the polarization angle "$\tau_1$". At this time, the second transmission signal input from the connection point 110b is output as the linearly polarized wave of the polarization angle "$\tau_2$".

As with the description in the second embodiment, the divider/combiner circuit 201b divides the transmission signal while imparting the phase difference. The control circuit 103 determines the phase shift amounts "$\phi_3$" and "$\phi_4$" at which the third transmission signal input from the connection point 110c is output as the linearly polarized wave of the polarization angle "$\tau_3$". The phase shift amounts "$\phi_3$" and "$\phi_4$" satisfy a formula (19):

[Formula 19]

$$\phi_3 - \phi_4 = 2\tau_3 + 90° \quad (19)$$

In the description of signal transmission by the antenna apparatus 320, the transmission signal input from a connection point 110d is referred to as a fourth transmission signal. The polarization angle "$\tau_4$" illustrated in FIG. 28 indicates the polarization angle of the linearly polarized wave based on the fourth transmission signal. Signals divided from the fourth transmission signal are referred to as a fourth left-hand circularly polarized signal and a fourth right-hand circularly polarized signal.

In the case where the phase shift amounts of the phase shifters 102c and 102d are "$\phi_3$" and "$\phi_4$", since the phase difference is provided between the fourth left-hand circularly polarized signal and the fourth right-hand circularly polarized signal, a phase difference "$\Delta\psi_4$" between the two signals is represented by a formula (20):

[Formula 20]

$$\Delta\psi_4 = 2\tau_3 + 180° \quad (20)$$

The formula (5) and the formula (20) can be modified to a formula (21):

[Formula 21]

$$\tau_4 = \frac{\Delta\psi_4}{2} = \tau_3 + 90° \quad (21)$$

As with the polarization angles "$\tau_1$" and "$\tau_2$", the difference between the polarization angles "$\tau_3$" and "$\tau_4$" is 90°. Accordingly, the polarization plane (polarization plane 3) of the linearly polarized wave based on the third transmission signal and the polarization plane (polarization plane 4) of the linearly polarized wave based on the fourth transmission signal are orthogonal to each other.

The operation by the antenna apparatus 320 in signal transmission has been described above. As for the operation by the antenna apparatus 320 in signal reception, outline is described because of the combination of the second embodiment and the third embodiment.

As with the description in the second embodiment, the antenna element 101 receives the linearly polarized wave of the polarization angle "$\tau_1$", and outputs the first left-hand circularly polarized signal and the first right-hand circularly polarized signal. The frequency band of the first left-hand circularly polarized signal and the first right-hand circularly polarized signal is the first frequency band. Therefore, the first left-hand circularly polarized signal and the first right-hand circularly polarized signal are respectively transmitted from the multiplexers/demultiplexers 108a and 108b to the phase shifters 102a and 102b.

The phase of the first left-hand circularly polarized signal and the phase of the first right-hand circularly polarized signal are shifted by the preset phase shift amounts by the phase shifters 102a and 102b. The phase-shifted first left-hand circularly polarized signal and the phase-shifted first right-hand circularly polarized signal are combined to the first received signal by the divider/combiner circuit 201a.

The first received signal is output at the power corresponding to the phase difference between the first left-hand circularly polarized signal and the first right-hand circularly polarized signal as combination sources, to the connection point 110a and the coupling circuit 105a. The coupling circuit 105a outputs a part of the first received signal to the control circuit 103. The control circuit 103 determines the phase shift amounts "$\phi_1$" and "$\phi_2$" corresponding to the polarization angle "$\tau_1$" based on the power of the input first received signal and the first characteristic information, and transmits the phase shift amounts "$\phi_1$" and "$\phi_2$" to the phase shifters 102a and 102b.

The phase shifters 102a and 102b change the preset phase shift amounts to the phase shift amounts "$\phi_1$" and "$\phi_2$", and perform the succeeding phase shift with use of the phase shift amounts "$\phi_1$" and "$\phi_2$".

Also in the case where the antenna element 101 receives the linearly polarized wave of the polarization angle "$\tau_2$", the control circuit 103 similarly determines the phase shift amounts "$\phi_1$" and "$\phi_2$".

As with the description in the third embodiment, the antenna element 101 receives the linearly polarized wave of the polarization angle "$\tau_3$", and outputs the third left-hand circularly polarized signal and the third right-hand circularly polarized signal. The frequency band of the third left-hand circularly polarized signal and the third right-hand circularly polarized signal is the second frequency band. Therefore, the third left-hand circularly polarized signal and the third right-hand circularly polarized signal are respectively transmitted from the multiplexers/demultiplexers 108a and 108b to the phase shifters 102c and 102d.

The phase of the third left-hand circularly polarized signal and the phase of the third right-hand circularly polarized signal are shifted by the preset phase shift amounts by the phase shifters 102c and 102d. The phase-shifted third left-hand circularly polarized signal and the phase-shifted third right-hand circularly polarized signal are combined to the third received signal by the divider/combiner circuit 201b.

The third received signal is output at the power corresponding to the phase difference between the third left-hand circularly polarized signal and the third right-hand circularly polarized signal as combination sources, to the connection point 110c and the coupling circuit 105b. The coupling circuit 105b outputs a part of the third received signal to the control circuit 103. The control circuit 103 determines the phase shift amounts "$\phi_3$" and "$\phi_4$" corresponding to the polarization angle "$\tau_3$" based on the power of the input third received signal and the second characteristic information, and transmits the phase shift amounts "$\phi_3$" and "$\phi_4$" to the phase shifters 102c and 102d.

The phase shifters 102c and 102d change the preset phase shift amounts to the phase shift amounts "$\phi_3$" and "$\phi_4$", and perform the succeeding phase shift with use of the phase shift amounts "$\phi_3$" and "$\phi_4$".

Also in the case where the antenna element 101 receives the linearly polarized wave of the polarization angle "$\tau_4$", the control circuit 103 similarly determines the phase shift amounts "$\phi_3$" and "$\phi_4$".

The operation by the antenna apparatus 320 has been described above. The antenna apparatus 320 can transmit and receive signals while handling two polarization angles, the polarization plane of which are orthogonal to each other, in the two different frequency bands. This makes it possible to efficiently transmit and receive signals.

Figure 29:
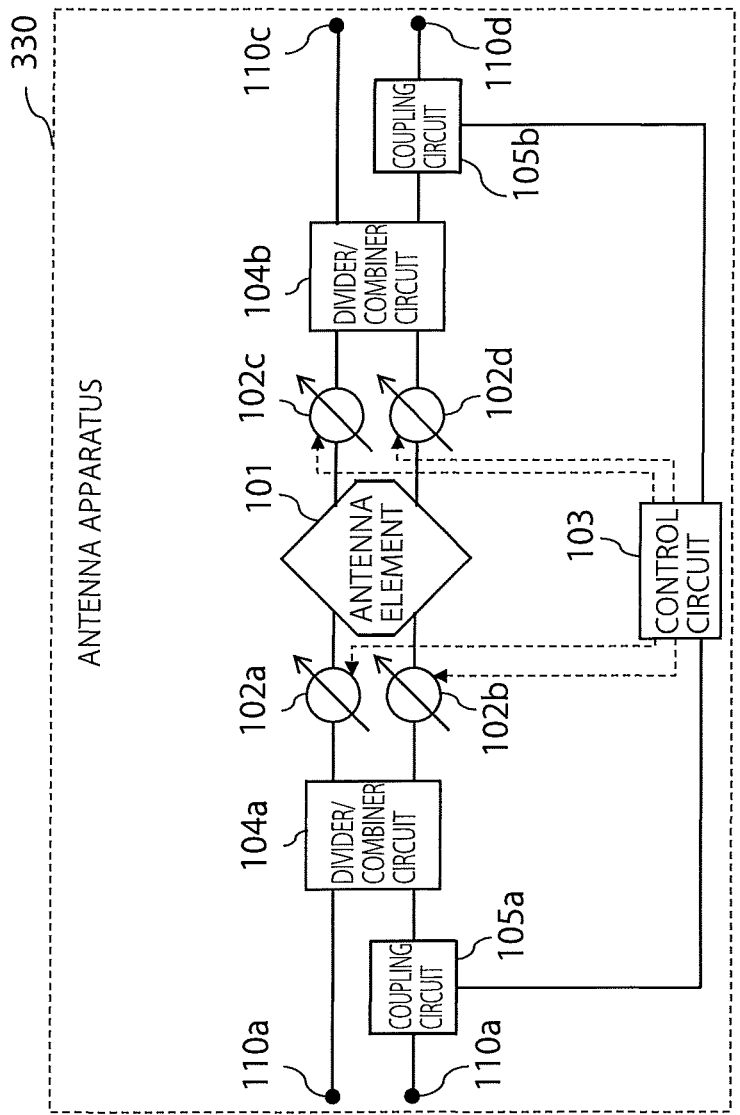
FIG. 29 is a configuration diagram of an antenna apparatus 330 applicable to the third embodiment.

The antenna apparatus 320 may not include the multiplexers/demultiplexers 108a and 108b. FIG. 29 illustrates an antenna apparatus 330 that is configured by eliminating the multiplexers/demultiplexers 108*a* and 108*b* from the antenna apparatus 300. The antenna element 101 can change an output destination depending on the frequency band of the received linearly polarized wave. For example, when the frequency band of the received linearly polarized wave is the first frequency band, the antenna element 101 outputs signals to the phase shifters 102*a* and 102*b*. When the frequency band of the received linearly polarized wave is the second frequency band, the antenna element 101 outputs signals to the phase shifters 102*c* and 102*d*.

Eliminating the multiplexers/demultiplexers 108*a* and 108*b* from the antenna apparatus 320 makes it possible to further downsize the antenna apparatus.

The antenna apparatus 300 according to the third embodiment and the modifications thereof have been described above. The antenna apparatus according to the present embodiment can transmit and receive the linearly polarized waves of different frequency bands by including the plurality of divider/combiner circuits. Since the antenna apparatus according to the present embodiment can handle the linearly polarized waves of the different frequency bands, it is possible to maintain the excellent XPD while controlling the polarization angles, and to efficiently transmit and receive signals.

The first to third embodiments have been described above. Application examples of the antenna apparatus described in the first to third embodiments are described below. As an example, application examples of the antenna apparatus 100 illustrated in FIG. 1 are described.

Figure 30:
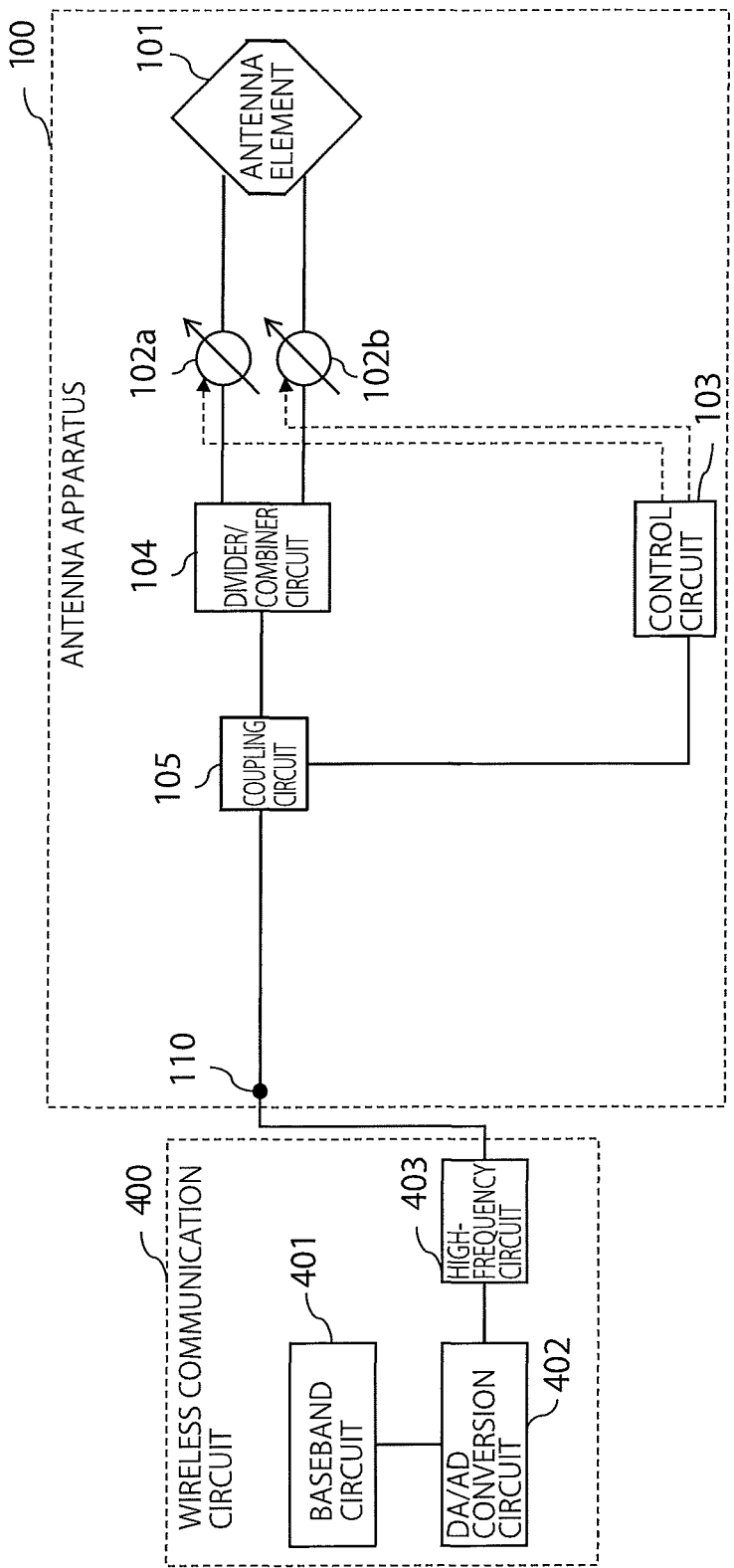
FIG. 30 is a diagram illustrating an electronic apparatus which includes a wireless communication circuit 400 and the antenna apparatus 100.

FIG. 30 illustrates an example of an electronic apparatus including the antenna apparatus 100 and an electronic circuit. Here, as the electronic circuit, a wireless communication circuit 400 is provided. The wireless communication circuit is connected to the antenna apparatus 100. The wireless communication circuit 400 uses the antenna apparatus 100 to perform wireless communication with a counterpart wireless communication device. The wireless communication circuit 400 includes a baseband circuit 401, a DA/AD conversion circuit 402, and a high-frequency circuit 403.

The baseband circuit 401 generates a frame or a packet conforming to a communication scheme, a specification, and the like to be used, and encodes and modulates a digital signal of the generated frame or packet.

The DA/AD conversion circuit 402 converts the modulated digital signal into an analog signal. The high-frequency circuit 403 extracts a signal of a desired band from the analog signal through band control, converts a frequency of the extracted signal to a radio frequency, amplifies the converted signal (high-frequency signal) by an amplifier (not illustrated) internally provided, and outputs the amplified signal to the connection point 110.

In reception, the high-frequency circuit 403 receives a high-frequency signal from the connection point 110. The high-frequency circuit 403 amplifies the received signal by the amplifier internally provided, extracts a signal of a desired band from the amplified signal, converts a frequency of the extracted signal to a baseband, and outputs a baseband signal to the DA/AD conversion circuit 402.

The DA/AD conversion circuit 402 converts the input baseband signal into a digital signal, and outputs the digital signal to the baseband circuit 401. The baseband circuit 401 demodulates and decodes the input digital signal to acquire a frame or a packet.

Figure 31:
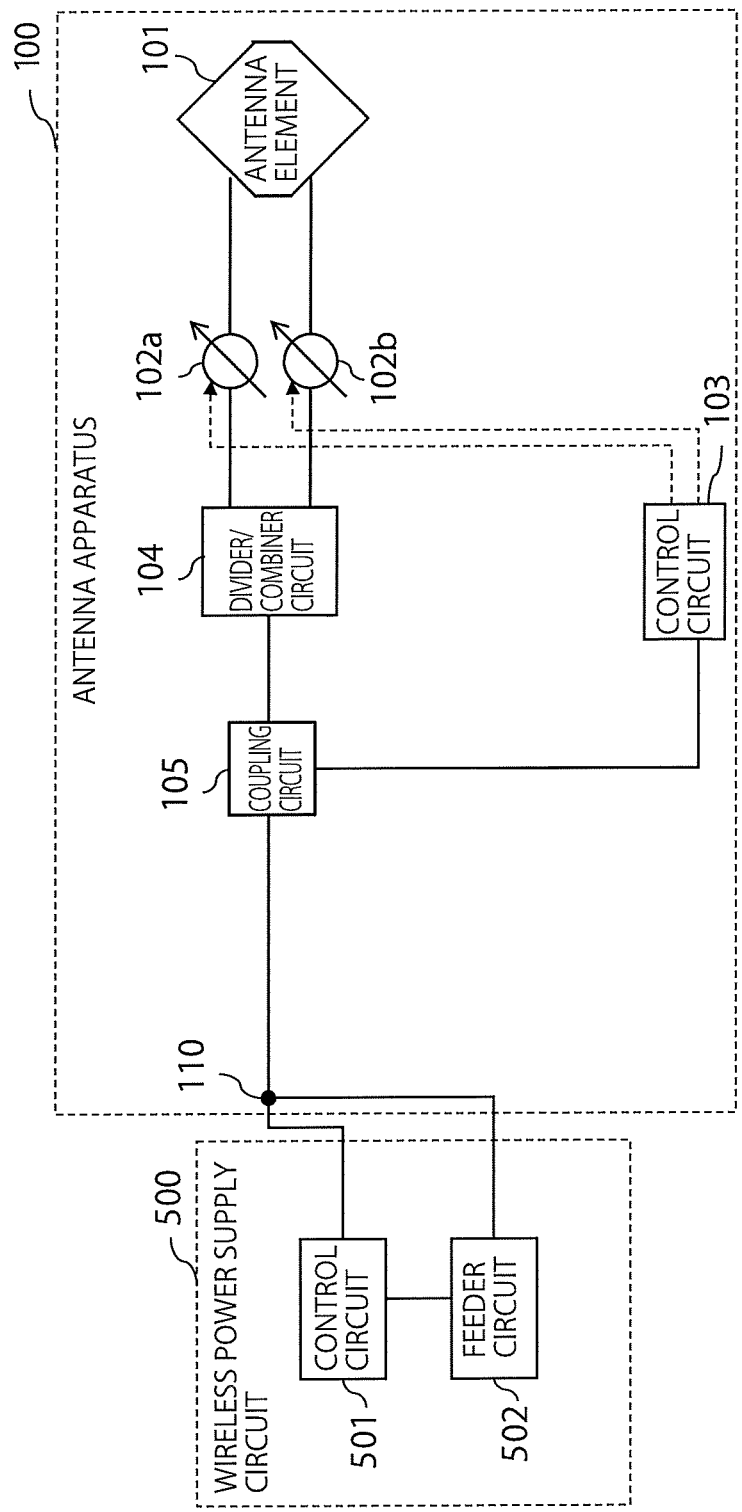
FIG. 31 is a diagram illustrating an electronic apparatus which includes a wireless power supply circuit 500 and the antenna apparatus 100.

FIG. 31 illustrates an example of an electronic apparatus including the antenna apparatus 100 and an electronic circuit. Here, as the electronic circuit, a wireless power supply circuit 500 is provided. The wireless power supply circuit 500 is connected to the antenna apparatus 100. The wireless power supply circuit 500 uses the antenna apparatus to perform wireless power transmission (hereinafter, also referred to as wireless power feeding) to a counterpart electronic device. The wireless power supply circuit 500 includes a control circuit 501 and a power supply circuit 502.

The control circuit 501 is a circuit controlling the wireless power feeding. The control circuit 501 instructs, for example, a start time and an end time of the wireless power feeding, a wireless power feeding time period, and a wireless power feeding amount. The instruction is transmitted to the power supply circuit 502. The control circuit 501 may determine the instruction to the power supply circuit 502 based on a signal transmitted from the antenna apparatus 100.

The power supply circuit 502 outputs a signal to perform the wireless power feeding in response to the instruction from the control circuit 501. The signal is transmitted to the counterpart electronic device through the antenna apparatus 100.

The application examples of the antenna apparatus 100 have been described above. The application examples are applicable to each of the antenna apparatus described in the first to third embodiments without being limited to the antenna apparatus 100.

Some embodiments, the modifications, and the application examples have been described above. The embodiments, the modifications, and the application examples can be combined and implemented.

While certain approaches have been described, these approaches have been presented by way of example only, and are not intended to limit the scope of the inventions. Indeed, the apparatuses described herein may be embodied in a variety of other forms; furthermore various omissions, substitutions and changes in the form of the apparatuses described herein may be made. The accompanying claims and their equivalents are intended to cover such forms or modifications as would fall within the scope of the inventions.

The invention claimed is:

1. An antenna apparatus, comprising:
   a first phase shifter to shift a phase of a left-hand circularly polarized signal representing a left-hand circularly polarized wave;
   a second phase shifter to shift a phase of a right-hand circularly polarized signal representing a right-hand circularly polarized wave;
   a control circuit configured to determine a first phase shift amount of the first phase shifter and a second phase shift amount of the second phase shifter based on a difference between a phase shift amount of the first phase shifter and a phase shift amount of the second phase shifter; and
   a radiating element to radiate the left-hand circularly polarized wave and the right-hand circularly polarized wave based on the left-hand circularly polarized signal of which the phase is shifted by the first phase shifter and the right-hand circularly polarized signal of which the phase is shifted by the second phase shifter.

2. The antenna apparatus according to claim 1, wherein the control circuit determines the first phase shift amount and the second phase shift amount further based on a first loss of a signal in the first phase shifter and a second loss of a signal in the second phase shifter.

3. The antenna apparatus according to claim 2, wherein the control circuit determines the first phase shift amount and the second phase shift amount to cause that the first loss is substantially equivalent to the second loss.

4. The antenna apparatus according to claim 1, further comprising a first divider circuit to divide a first transmission signal into a first left-hand circularly polarized signal transmitted to the first phase shifter and a first right-hand circularly polarized signal transmitted to the second phase shifter.

5. The antenna apparatus according to claim 4, wherein
the first divider circuit divides a second transmission signal into a second left-hand circularly polarized signal transmitted to the first phase shifter and a second right-hand circularly polarized signal transmitted to the second phase shifter,
a phase of the first left-hand circularly polarized signal and a phase of the second left-hand circularly polarized signal are shifted by the first phase shift amount by the first phase shifter,
a phase of the first right-hand circularly polarized signal and a phase of the second right-hand circularly polarized signal are shifted by the second phase shift amount by the second phase shifter, and
a first polarization plane of a polarized wave based on the first left-hand circularly polarized signal and the first right-hand circularly polarized signal is orthogonal to a second polarization plane of a polarized wave based on the second left-hand circularly polarized signal and the second right-hand circularly polarized signal.

6. The antenna apparatus according to claim 4, further comprising:
a third phase shifter to shift the phase of the left-hand circularly polarized signal representing the left-hand circularly polarized wave;
a fourth phase shifter to shift the phase of the right-hand circularly polarized signal representing the right-hand circularly polarized wave; and
a second divider circuit to divide a third transmission signal into a third left-hand circularly polarized signal transmitted to the third phase shifter and a third right-hand circularly polarized signal transmitted to the fourth phase shifter, wherein
the control circuit determines a third phase shift amount of the third phase shifter and a fourth phase shift amount of the fourth phase shifter based on a difference between a phase shift amount of the third phase shifter and a phase shift amount of the fourth phase shifter.

7. The antenna apparatus according to claim 6, wherein
the second divider circuit divides a fourth transmission signal into a fourth left-hand circularly polarized signal transmitted to the third phase shifter and a fourth right-hand circularly polarized signal transmitted to the fourth phase shifter,
a phase of the third left-hand circularly polarized signal and a phase of the fourth left-hand circularly polarized signal are shifted by the third phase shift amount by the third phase shifter,
a phase of the third right-hand circularly polarized signal and a phase of the fourth right-hand circularly polarized signal are shifted by the fourth phase shift amount by the fourth phase shifter, and
a third polarization plane of a polarized wave based on the third left-hand circularly polarized signal and the third right-hand circularly polarized signal is orthogonal to a fourth polarization plane of a polarized wave based on the fourth left-hand circularly polarized signal and the fourth right-hand circularly polarized signal.

8. The antenna apparatus according to claim 6, wherein a frequency band of the left-hand circularly polarized signal in the first phase shifter is different from a frequency band of the left-hand circularly polarized signal in the third phase shifter, or
a frequency band of the right-hand circularly polarized signal in the second phase shifter is different from a frequency band of the right-hand circularly polarized signal in the fourth phase shifter.

9. An antenna apparatus, comprising:
a radiating element to receive a left-hand circularly polarized wave and a right-hand circularly polarized wave;
a first phase shifter to shift a phase of a left-hand circularly polarized signal representing the left-hand circularly polarized wave;
a second phase shifter to shift a phase of a right-hand circularly polarized signal representing the right-hand circularly polarized wave; and
a control circuit configured to determine a first phase shift amount of the first phase shifter and a second phase shift amount of the second phase shifter based on a difference between a phase shift amount of the first phase shifter and a phase shift amount of the second phase shifter.

10. The antenna apparatus according to claim 9, wherein the control circuit determines the first phase shift amount and the second phase shift amount further based on a first loss of a signal in the first phase shifter and a second loss of a signal in the second phase shifter.

11. The antenna apparatus according to claim 10, wherein the control circuit determines the first phase shift amount and the second phase shift amount to cause that the first loss is substantially equivalent to the second loss.

12. The antenna apparatus according to claim 9, further comprising a first combiner circuit to combine a first left-hand circularly polarized signal of which the phase is shifted by the first phase shifter and a first right-hand circularly polarized signal of which the phase is shifted by the second phase shifter to generate a first received signal.

13. The antenna apparatus according to claim 12, wherein
the first combiner circuit combines a second left-hand circularly polarized signal of which the phase is shifted by the first phase shifter and a second right-hand circularly polarized signal of which the phase is shifted by the second phase shifter to generate a second received signal,
a first polarization plane of a first polarized wave received by the radiating element is orthogonal to a second polarization plane of a second polarized wave received by the radiating element,
the radiating element transmits the first left-hand circularly polarized signal to the first phase shifter and the first right-hand circularly polarized signal to the second phase shifter from the first polarized wave, and
the radiating element transmits the second left-hand circularly polarized signal to the first phase shifter and the second right-hand circularly polarized signal to the second phase shifter from the second polarized wave.

14. The antenna apparatus according to claim 13, wherein
the first combiner circuit transmits at least a part of at least one of the first received signal and the second received signal, to the control circuit, and
the control circuit determines the first phase shift amount and the second shift amount further based on power at least the part of at least one of the first received signal and the second received signal.

15. The antenna apparatus according to claim 9, further comprising:
a third phase shifter to shift the phase of the left-hand circularly polarized signal representing the left-hand circularly polarized wave;
a fourth phase shifter to shift the phase of the right-hand circularly polarized signal representing the right-hand circularly polarized wave;
a second combiner circuit to combine a third left-hand circularly polarized signal of which the phase is shifted by the third phase shifter and a third right-hand circularly polarized signal of which the phase is shifted by the fourth phase shifter to generate a third received signal, wherein
the control circuit determines a third phase shift amount of the third phase shifter and a fourth phase shift amount of the fourth phase shifter based on a difference between a phase shift amount of the third phase shifter and a phase shift amount of the fourth phase shifter.

16. The antenna apparatus according to claim 15, wherein
the second combiner circuit combines a fourth left-hand circularly polarized signal of which the phase is shifted by the third phase shifter and a fourth right-hand circularly polarized signal of which the phase is shifted by the fourth phase shifter to generate a fourth received signal,
a third polarization plane of a third polarized wave received by the radiating element is orthogonal to a fourth polarization plane of a fourth polarized wave received by the radiating element,
the radiating element transmits the third left-hand circularly polarized signal to the third phase shifter and the third right-hand circularly polarized signal to the fourth phase shifter from the third polarized wave, and
the radiating element transmits the fourth left-hand circularly polarized signal to the third phase shifter and the fourth right-hand circularly polarized signal to the fourth phase shifter from the fourth polarized wave.

17. The antenna apparatus according to claim 16, wherein
the second combiner circuit transmits at least a part of at least one of the third received signal and the fourth received signal, to the control circuit, and
the control circuit determines the third phase shift amount and the fourth phase shift amount further based on power of at least the part of at least one of the third received signal and the fourth received signal.

18. The antenna apparatus according to claim 15, wherein
a frequency band of the left-hand circularly polarized signal in the first phase shifter is different from a frequency band of the left-hand circularly polarized signal in the third phase shifter, or
a frequency band of the right-hand circularly polarized signal in the second phase shifter is different from and a frequency band of the right-hand circularly polarized signal in the fourth phase shifter.

19. An electronic apparatus, comprising:
the antenna apparatus according to claim 1; and
an electronic circuit to supply a signal related to wireless communication or wireless power supply to the antenna apparatus.

20. A method, comprising:
shifting a phase of a left-hand circularly polarized signal representing a left-hand circularly polarized wave at a first phase shifter;
shifting a phase of a right-hand circularly polarized signal representing a right-hand circularly polarized wave at a second phase shifter;
determining a first phase shift amount of the left-hand circularly polarized signal and a second phase shift amount of the right-hand circularly polarized signal based on a difference between a phase shift amount of the first phase shifter and a phase shift amount of the second phase shifter.

* * * * *